United States Patent
Cheng

(10) Patent No.: US 8,515,162 B2
(45) Date of Patent: Aug. 20, 2013

(54) QR CODE PROCESSING METHOD AND APPARATUS THEREOF

(75) Inventor: Ting-Yuan Cheng, Taipei County (TW)

(73) Assignee: Primax Electronics Ltd., Neihu, Taipei (TW)

( * ) Notice: Subject to any disclaimer, the term of this patent is extended or adjusted under 35 U.S.C. 154(b) by 774 days.

(21) Appl. No.: 12/685,669

(22) Filed: Jan. 11, 2010

(65) Prior Publication Data
US 2011/0085732 A1    Apr. 14, 2011

(30) Foreign Application Priority Data
Oct. 9, 2009   (TW) ............................... 98134287 A

(51) Int. Cl.
G06K 9/00      (2006.01)
G06K 7/10      (2006.01)
G06K 7/00      (2006.01)
G06K 5/04      (2006.01)

(52) U.S. Cl.
USPC ................. 382/162; 235/462.01; 235/462.04; 235/462.06; 235/462.08; 235/462.09; 235/462.1; 235/462.11

(58) Field of Classification Search
None
See application file for complete search history.

(56) References Cited

U.S. PATENT DOCUMENTS

| | | | |
|---|---|---|---|
| 2004/0020989 A1* | 2/2004 | Muramatsu | 235/462.1 |
| 2006/0082475 A1* | 4/2006 | Zhao et al. | 341/50 |
| 2007/0228171 A1* | 10/2007 | Thiyagarajah | 235/462.09 |
| 2008/0249663 A1* | 10/2008 | Aoyama | 700/259 |

* cited by examiner

Primary Examiner — Amir Alavi
Assistant Examiner — Kenny Cese
(74) Attorney, Agent, or Firm — Winston Hsu; Scott Margo

(57) ABSTRACT

A QR code processing method includes an edge processing process, a QR code positioning process and a projection modification process. The edge processing process converts an original image into a binarized input image. The QR code positioning process includes a group search process and a tag search process. The group search process includes: deriving a plurality of luminance groups according to luminance values of pixels within an input image; identifying a plurality of finder pattern groups complying with QR code finder pattern among the plurality of luminance groups according to a central point of each luminance group; and deriving position information of each finder pattern group. The tag search process derives position information of the QR code according to the position information of the finder pattern groups. The projection modification process converts the input image into a modified image according to the position information of the QR code.

2 Claims, 21 Drawing Sheets

QR CODE PROCESSING METHOD AND APPARATUS THEREOF

BACKGROUND OF THE INVENTION

1. Field of the Invention

The present invention relates to a processing method of quick response code (QR code) and a related apparatus, and more particularly, to a processing method of detecting and adjusting a QR code within an input image, and a related apparatus.

2. Description of the Prior Art

For business activities such as trading goods and inventory management, a one-dimension bar code provides a fast and convenient identification method. However, in our rapidly modernizing society, the information volume provided by the one-dimension bar code gradually becomes inefficient. Quick response code (QR code) is a two-dimension code developed by the Japanese corporation Denso Wave. Its original purpose was for vehicle part management. Compared with the conventional one-dimension barcode, QR code is capable of providing more information capacity since the content is stored in a two-dimension surface. Furthermore, when combined with modern technologies such as digital cameras and wireless network, QR code can provide an abundant variety of consumer related usages.

Please refer to FIG. 1, which is a diagram of a conventional QR code. A normal QR code includes a finder pattern, an alignment pattern, a timing pattern, a quiet zone, a format area and a data area, wherein the finder pattern and the timing pattern are tools for positioning a QR code and determining its size, and the alignment pattern is for correcting errors resulting from identification.

A surface where the QR code is located is very susceptible to projection distortion and unevenly distributed luminance such that following decoding processes may be unable to proceed and thereby a proper result cannot be derived. Please refer to FIG. 2 and FIG. 3. FIG. 2 is a diagram of a projection distortion of a QR code due to uneven distances between both sides of the QR code and an image capture apparatus (e.g., a digital camera). FIG. 3 is a diagram of a QR code partially covered by shadow (a slashed part on the upper right corner in FIG. 3). Both the cases described above tend to lead to failure of a QR decoder to correctly decode the content within the QR code. Therefore, how to derive a QR code properly in a given image is still a major issue in this field.

SUMMARY OF THE INVENTION

In light of this, the present invention provides a detecting and processing method of QR code, and a related apparatus, for preprocessing an original image, ruling out influence of projection distortion and/or uneven luminance distribution and adjusting the original image to facilitate following decoding processes.

According to a first embodiment of the present invention, a processing method of quick response code (QR code) is provided. The QR code process comprises an edge processing procedure, a QR code positioning procedure and a projection modification procedure. The QR code positioning procedure comprises a group searching procedure and a tag searching procedure. The edge processing procedure converts an original image to derive a binarized input image. The group searching procedure derives a plurality of finder pattern groups complying with a finder pattern of the QR code, comprising: deriving a plurality of luminance groups according to a luminance of each pixel within the input image; utilizing a determining circuit to identify the finder pattern groups complying with the finder pattern of the QR code according to each center point of each luminance group among the luminance groups; and deriving the position information of each finder pattern group of the finder pattern groups. The tag searching procedure derives a position information of the QR code according to the position information of the finder pattern groups. The projection modification procedure converts the original image into a modified image according to the position information of the QR code.

According to a second embodiment of the present invention, a processing method of QR code is provided for converting an input image into a QR code according to the input image and a position information of the QR code, wherein the QR code comprises a plurality of image blocks. The processing method comprises a timing pattern searching procedure and an image block adjusting procedure. The timing pattern searching procedure comprises setting a plurality of searching axes among a plurality of finder patterns of the QR code; for each searching axis, applying a mask to derive a luminance information of the searching axis and deriving a maximum image block number corresponding to the searching axis according to the luminance information; and determining a plurality of timing patterns according to a plurality of the maximum image block numbers corresponding to the searching axes. The image block adjusting procedure selectively adjusts a position of each image block of the QR code according to the finder patterns and the timing patterns of the QR code.

According to a third embodiment of the present invention, a processing apparatus of QR code is provided, which includes an edge processing module, a QR code positioning module and a projection modification module. The edge processing module converts an original image to derive a binarized input image. The QR code positioning module is for deriving a position information of a QR code from the input image. The QR code positioning module comprises a group searching element and a tag searching element. The group searching element is for deriving a plurality of finder pattern groups complying with a finder pattern of the QR code, comprising a capture circuit, a determining circuit and a finder pattern positioning circuit. The capture circuit derives a plurality of luminance groups according to a luminance of each pixel within the input image. The determining circuit is for identifying the finder pattern groups complying with the finder pattern of the QR code according to each center point of each luminance group among the luminance groups. The finder pattern positioning circuit is for deriving the position information of each finder pattern group of the finder pattern groups. The tag searching element derives a position information of the QR code according to the position information of the finder pattern groups. The projection modification module converts the original image into a modified image according to the position information of the QR code.

According to a fourth embodiment of the present invention, a processing apparatus of QR code is provided for converting an input image into a QR code according to position information of the input image and the QR code, wherein the QR code comprises a plurality of image blocks. The processing apparatus comprises a timing pattern searching module and an image block adjusting module. The timing pattern searching module comprises a searching axis circuit, a mask circuit and a determining circuit. The searching axis circuit is for setting a plurality of searching axes among a plurality of finder patterns of the QR code. The mask circuit applies a mask for each searching axis to derive a luminance information of the searching axis and derives a maximum image block number corresponding to the searching axis according to the luminance information. The determining circuit is for determining a plurality of timing patterns according to a plurality of maximum image block number corresponding to the searching axes. The image block adjusting module is for selectively adjusting a position of each image block of the QR code according to the finder patterns and the timing patterns of the QR code.

The present invention therefore provides a QR code processing method and an apparatus thereof, which can effectively derive a QR code within an input image and derive related information to modify projection distortion and uneven luminance distribution. In addition, the present invention is capable of further adjusting the QR code such that it can be decoded and processed by following processing apparatus more easily.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
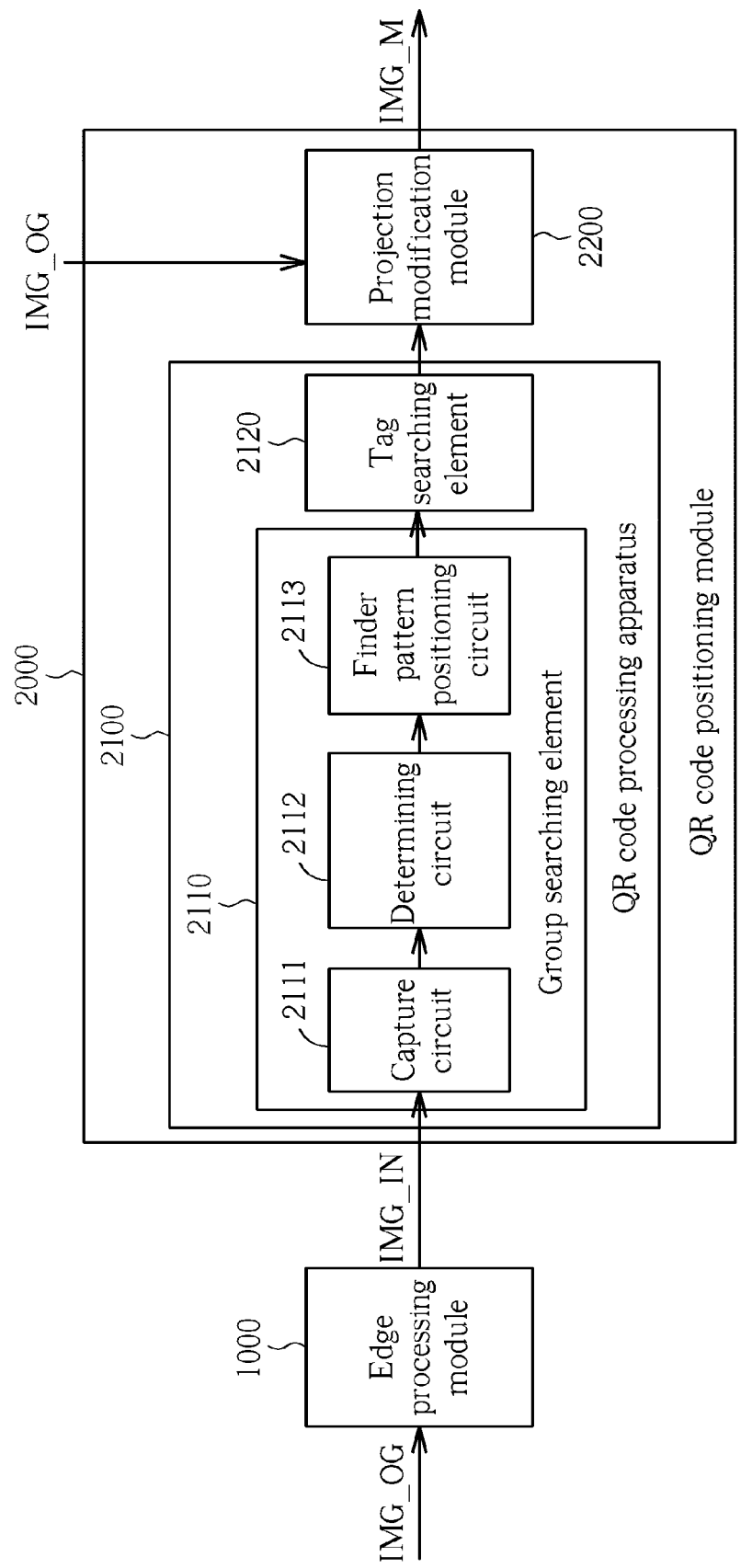
FIG. 4 is a system block diagram of a QR code processing apparatus according to one embodiment of the present invention.
Figure 5:
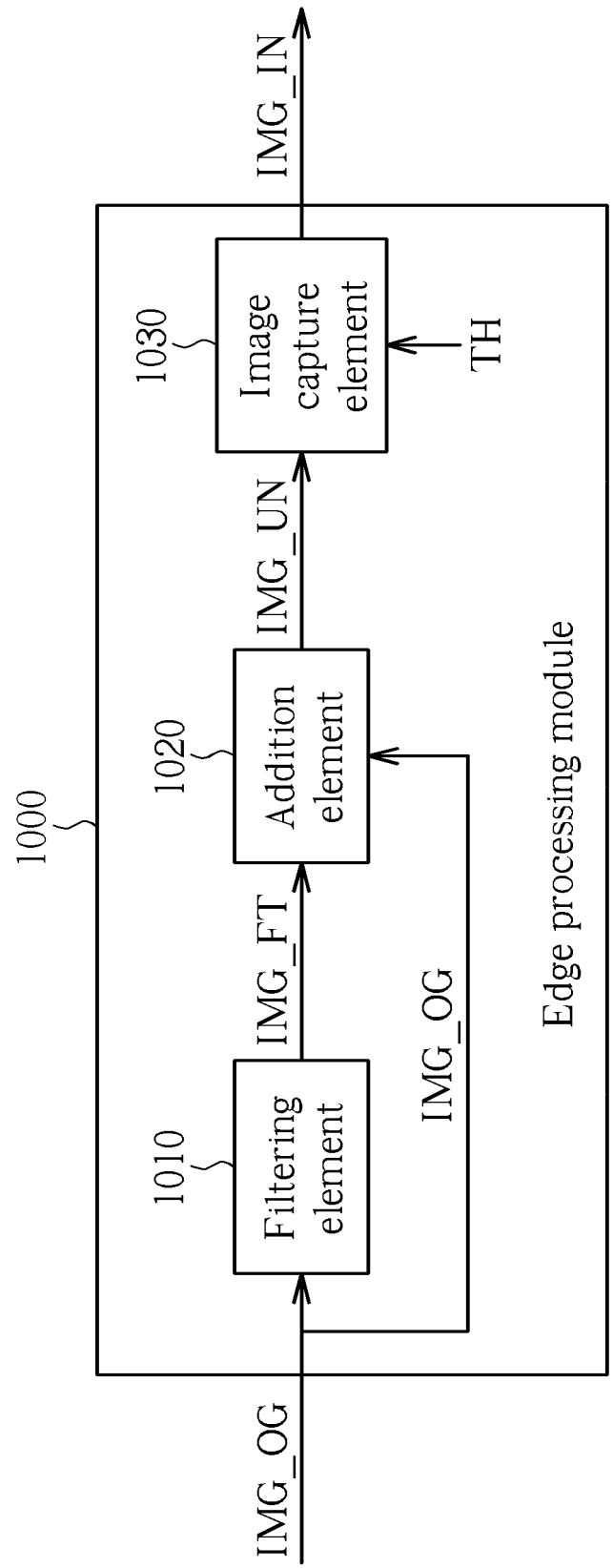
FIG. 5 is an exemplary block diagram of the edge processing module shown in FIG. 4.
Figure 6:
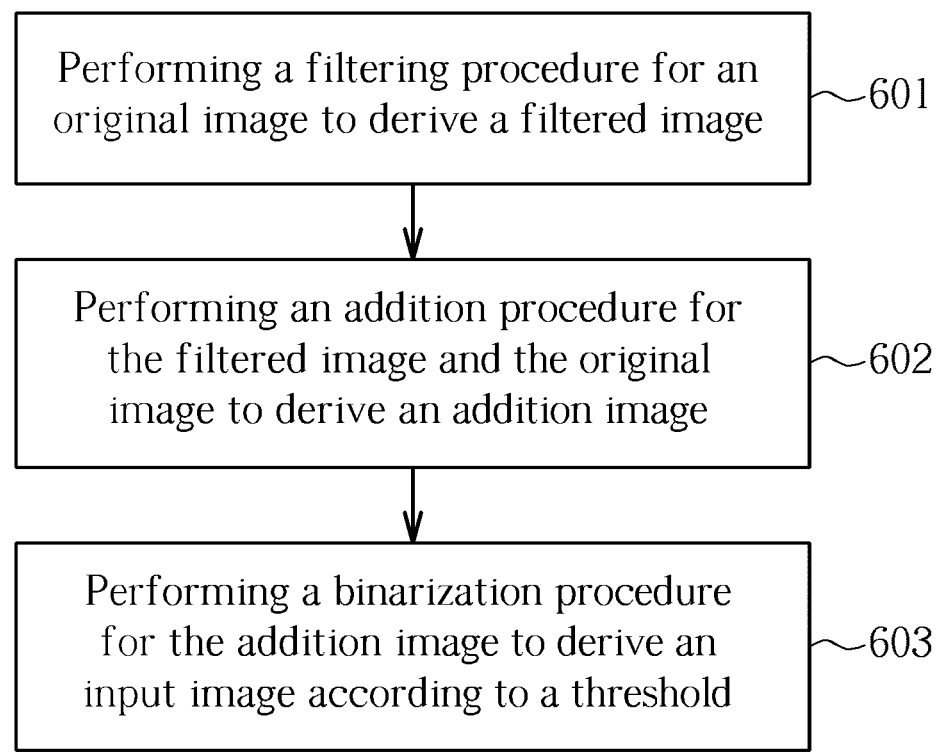
FIG. 6 is an operation flowchart of the edge processing module shown in FIG. 4.

Please refer to FIG. 4. FIG. 4 is a system block diagram of a QR code processing apparatus according to one embodiment of the present invention, which includes (but is not limited to) an edge processing module 1000 for enhancing edges of objects in an image and a QR code processing apparatus 2000. Please refer to FIG. 4, FIG. 5 and FIG. 6 simultaneously. FIG. 5 is an exemplary block diagram of an edge processing module 1000 in FIG. 4. FIG. 6 is an operation flowchart of an edge processing module 1000 in FIG. 4. In FIG. 5, the edge processing module 1000 includes a filtering element 1010, an addition element 1020 and an image capture element. The filtering element 1010 is for performing a filtering procedure for an original image IMG_OG to derive a filtered image IMG_FT (step 601). The addition element 1020 performs an addition procedure for the filtered image IMG_FT and the original image IMG_OG to derive an addition image IMG_UN (step 602). The image capture element performs a binarization procedure for the addition image IMG_UN to derive an input image IMG_IN according to a threshold TH (step 603). After the filtering process of the original image IMG_OG, a filtered image IMG_FT with enhanced object edge image can be derived. The following equation is an exemplary filter F adopted in this embodiment:

$$F = \frac{1}{7} \times \begin{bmatrix} -1 & -2 & -1 \\ -2 & 19 & -2 \\ -1 & -2 & -1 \end{bmatrix} \quad (1)$$

The addition image IMG_UN, which is from the filtered image IMG_FT and the original image IMG_OG, has a more obvious contrast of brightness and darkness than the original image IMG_OG, i.e., a luminance difference between each pixel within the addition image IMG_UN will be larger than the addition procedure, and a difference between high-luminance pixels and low-luminance pixels will become more obvious. In this way, the image capture element 1030 can binarize high-luminance pixels and low-luminance pixels to derive the input image IMG_IN according to the threshold TH.

Please note that, in this embodiment, the QR code processing apparatus applies the edge processing module 1000 to derive an edge-enhanced binarized image (i.e., the input image IMG_IN) to facilitate the following processing of the QR code processing apparatus 2000. However, in other embodiments, the original image IMG_OG can also be an input of the QR code processing apparatus 2000 to be processed without the edge processing module 1000. This variation in design also falls within the scope of the present invention.

Figure 1:
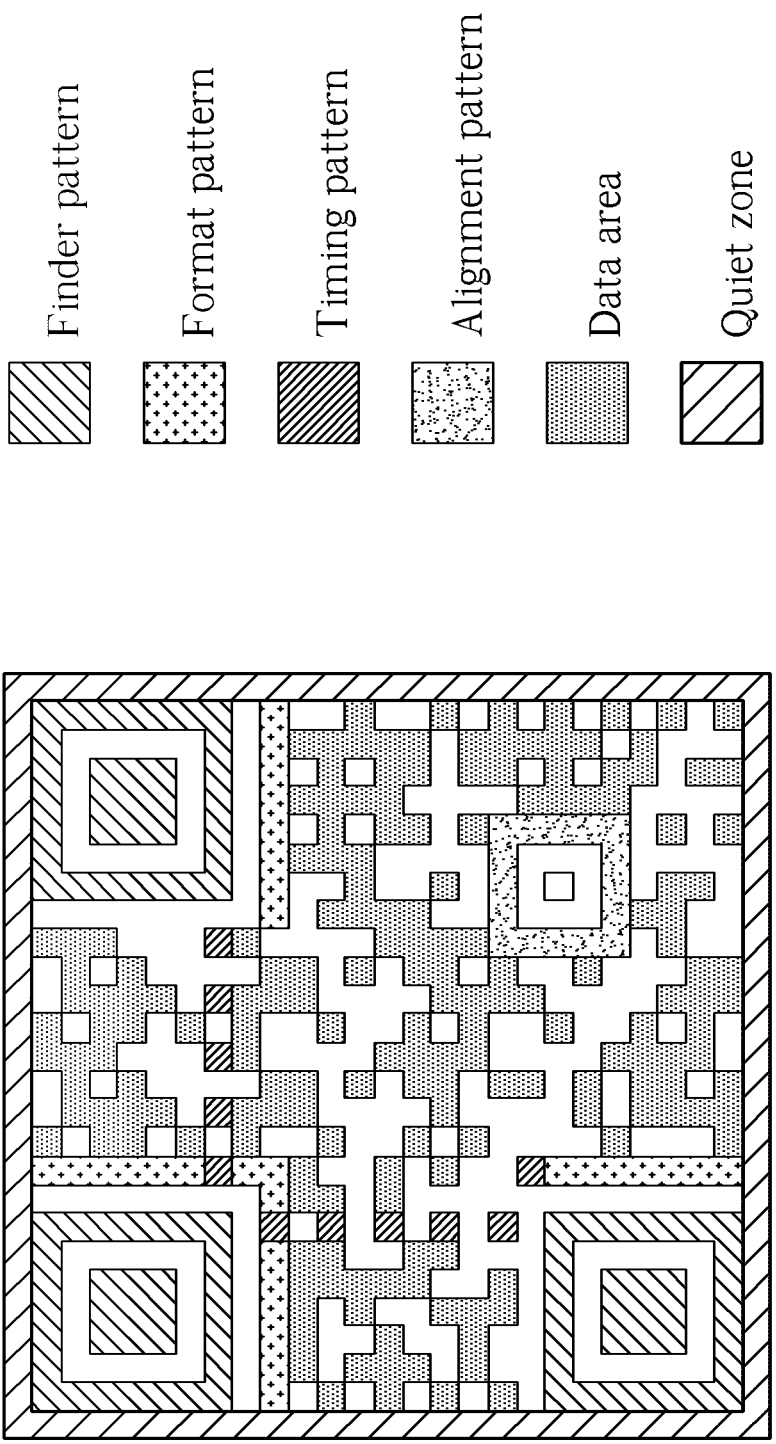
FIG. 1 is a diagram of a conventional QR code.
Figure 2:
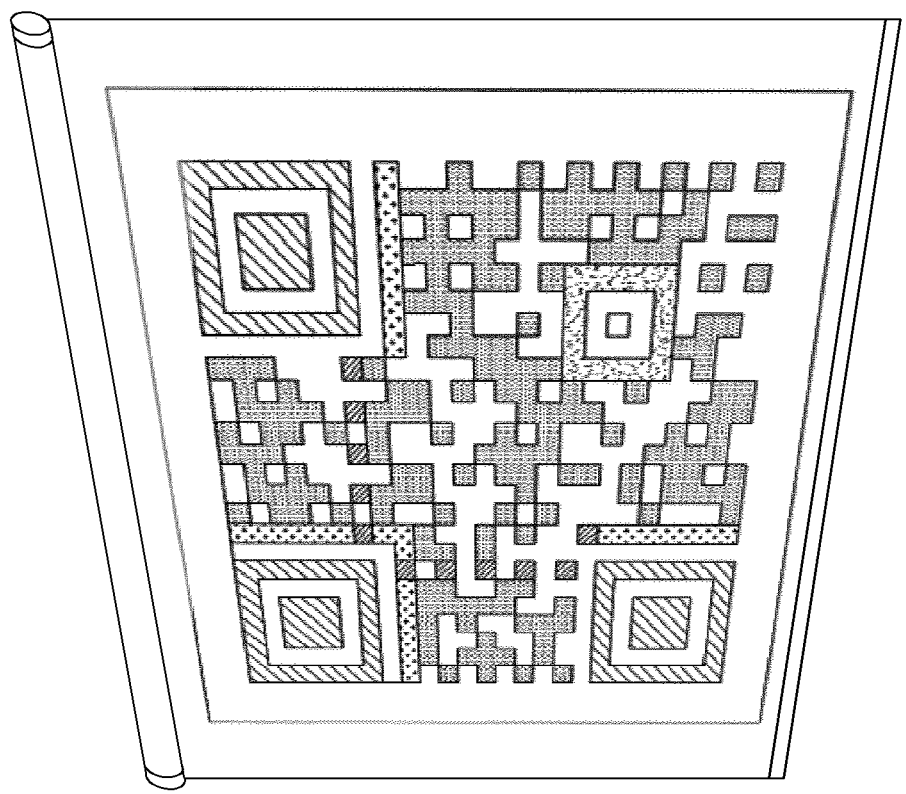
FIG. 2 is a diagram of a projection distortion of a QR code due to uneven distances between both sides of the QR code and an image capture apparatus.
Figure 3:
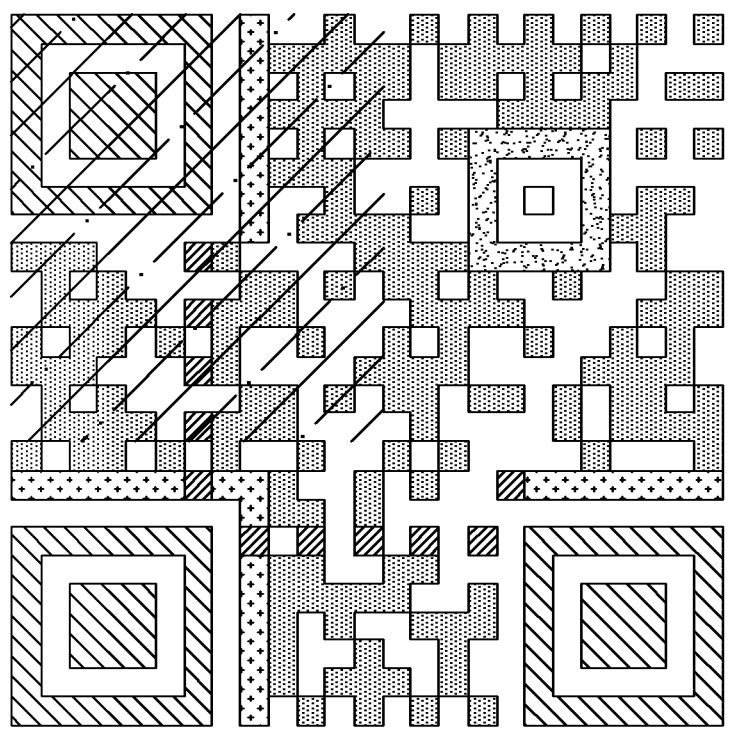
FIG. 3 is a diagram of a QR code partially covered by shadow.
Figure 7:
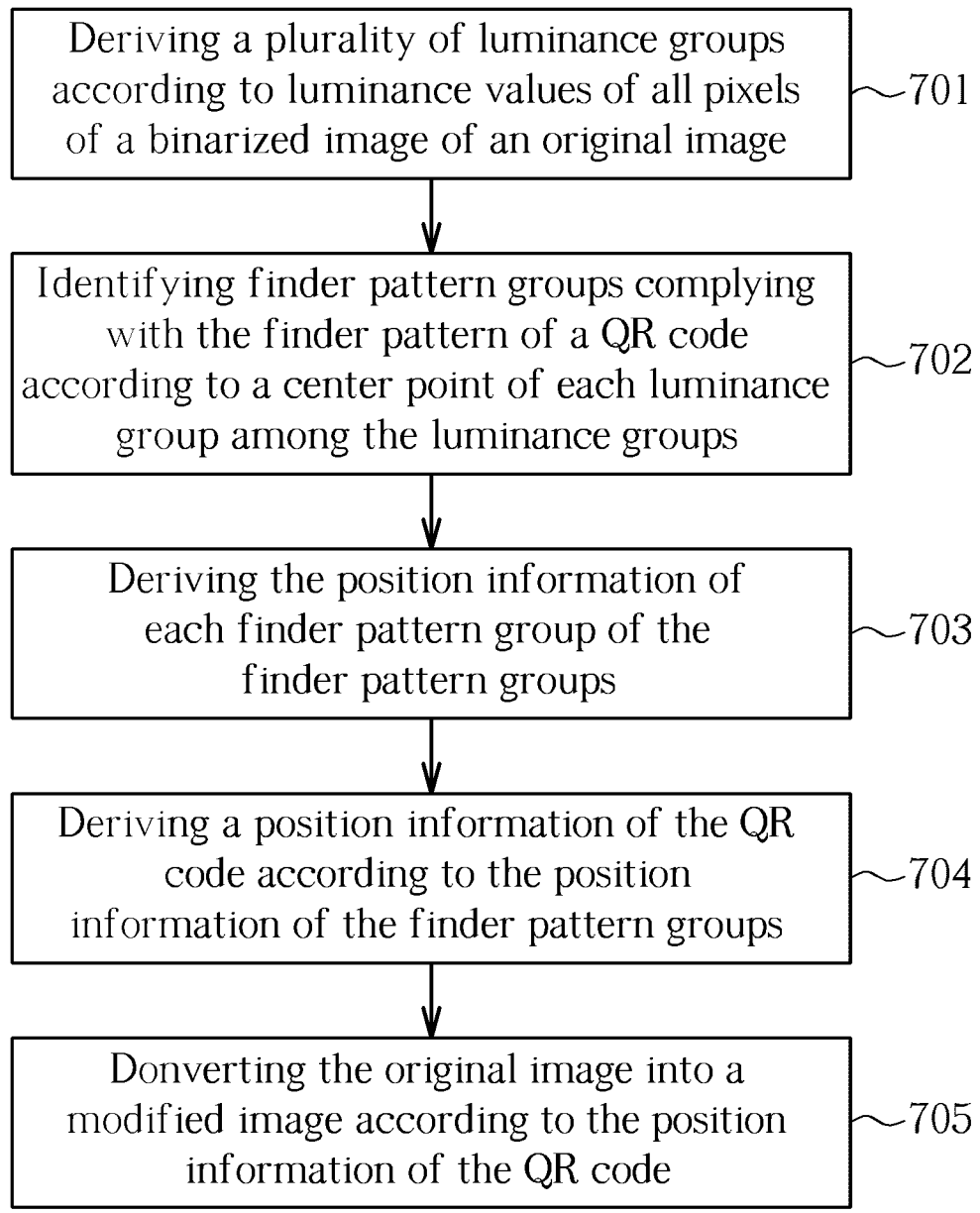
FIG. 7 is an exemplary operation flowchart of the QR code processing apparatus shown in FIG. 4.

Please refer to FIG. 4 again. The QR code processing apparatus 2000 in FIG. 4 has a QR code positioning module 2100 and a projection modification module 2200. The QR code positioning module 2100 is for deriving a position information of a QR code from the input image IMG_IN, wherein the QR code positioning module 2100 includes a group searching element 2110 and a tag searching element 2120. Please refer to FIG. 7 in conjunction with FIG. 4. FIG. 7 is an exemplary operation flowchart of the QR code processing apparatus 2000 in FIG. 4. In this embodiment, the group searching element 2110 includes a capture circuit 2111, determining circuit 2112 and a finder pattern positioning circuit 2113. The capture circuit 2111 is for deriving a plurality of low-luminance groups according to a luminance of each pixel in the input image IMG_IN (step 701). The determining circuit 2112 thereby identifies the finder pattern groups complying with the finder pattern of the QR code according to a center point of each low-luminance group among the luminance groups (step 702). Please note that, in this embodiment, the present invention processes the low-luminance groups; however, this is not supposed to be a limitation of the present invention, and a processing of high-luminance groups also falls within the scope of the present invention. Please refer to the finder pattern in FIG. 1 again. From FIG. 1, it should be obvious that each finder pattern of a QR code is composed of a dark square block and a dark square frame surrounding the dark square block. Due to the special composition of the finder pattern itself, a center of the dark square block and a center of the dark square frame will coincide at the same point. The determining circuit 2112 thereby utilizes this property of a coincided center to derive groups complying with the aforementioned property from the low-luminance groups within the input image IMG_IN. In this way, the finder pattern groups complying with a finder pattern of a QR code can be found quickly. The finder pattern positioning circuit 2113 is for deriving the position information of each finder pattern group of the finder pattern groups (step 703). The tag searching element 2120 receives the position information of finder pattern groups from the finder pattern positioning circuit 2113, and derives a position information of the QR code according to the position information of the finder pattern groups (step 704). Finally, the projection modification module 2200 converts the original image IMG_OG into a modified image IMG_M according to the position information of the QR code (step 705).

Figure 8:
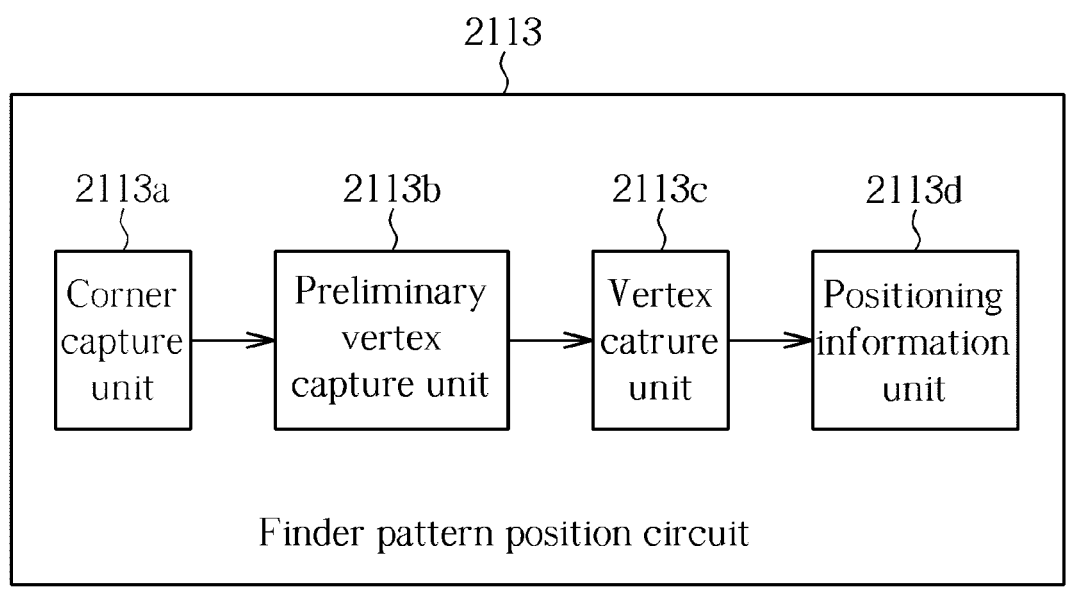
FIG. 8 is an exemplary block diagram of the finder pattern positioning circuit shown in FIG. 4.
Figure 9:
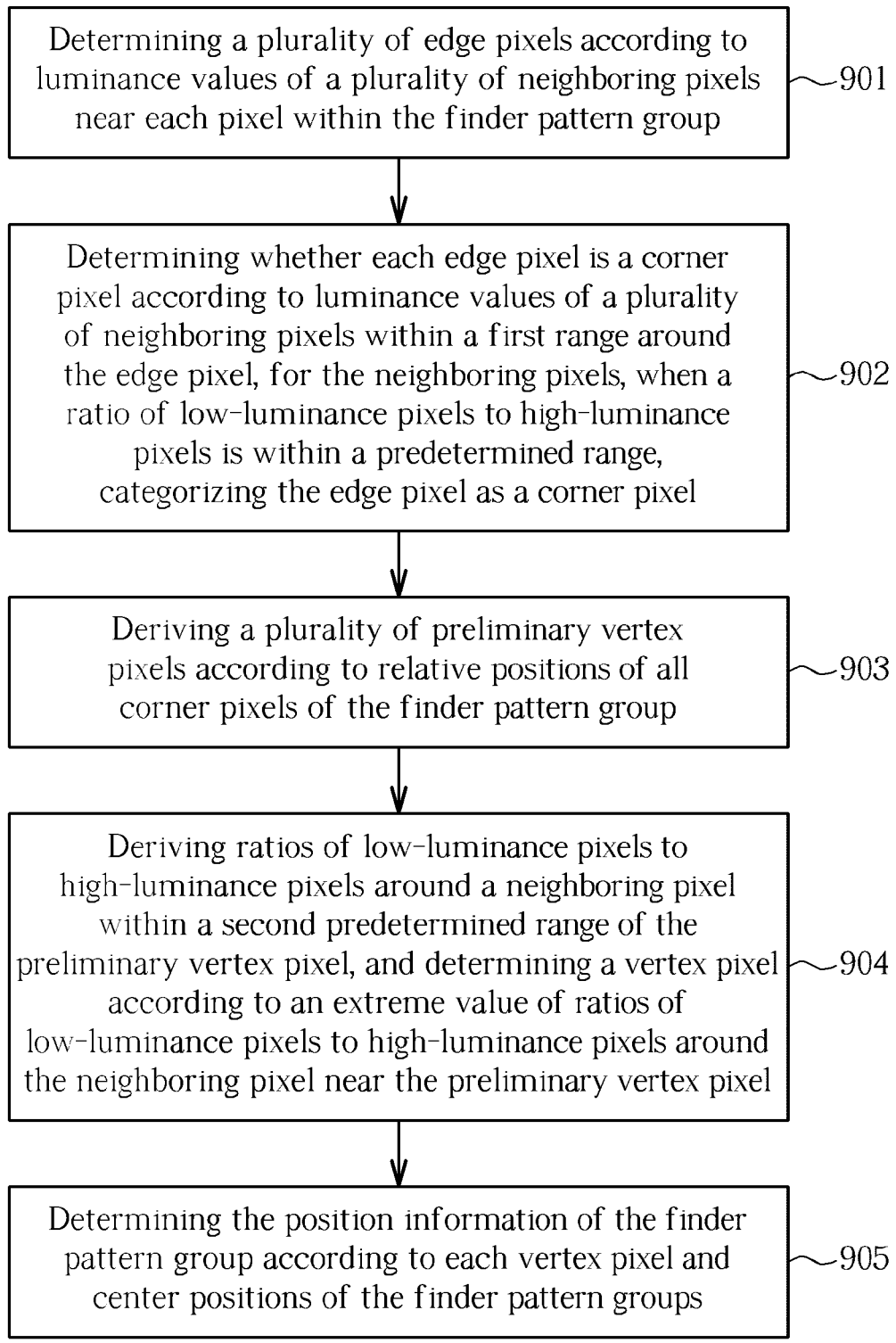
FIG. 9 is an exemplary operation flowchart of the finder pattern positioning circuit shown in FIG. 4.

Please refer to FIG. 8, which is an exemplary block diagram of a finder pattern positioning circuit 2113 in FIG. 4. In this embodiment, the finder pattern positioning circuit 2113 includes a corner capture unit 2113a, a preliminary vertex capture unit 2113b, a vertex capture unit 2113c and a position information unit 2113d. Please refer to FIG. 9 in conjunction with FIG. 8. FIG. 9 is an exemplary operation flowchart of a finder pattern positioning circuit 2113 in FIG. 4. The operation of the finder pattern positioning circuit 2113 is described as follows.

For each finder pattern group, the corner capture unit 2113a determines a plurality of edge pixels according to luminance values of a plurality of neighboring pixels near each pixel within the finder pattern group (step 901), and determines whether each edge pixel is a corner pixel according to luminance values of a plurality of neighboring pixels within a first range around the edge pixel. For the neighboring pixels, when a ratio of low-luminance pixels to high-luminance pixels is within a predetermined range, the corner capture unit 2113a categorizes the edge pixel as a corner pixel (step 902). The preliminary vertex capture unit 2113b derives a plurality of preliminary vertex pixels according to relative positions of all corner pixels of the finder pattern group (step 903). For each preliminary vertex pixel, the vertex capture unit 2113c derives ratios of low-luminance pixels to high-luminance pixels around a neighboring pixel within a second predetermined range of the preliminary vertex pixel, and determines a vertex pixel according to an extreme value of ratios of low-luminance pixels to high-luminance pixels around the neighboring pixel near the preliminary vertex pixel (step 904). Next, the position information unit 2113d determines the position information of the finder pattern group according to each vertex pixel and center positions of the finder pattern groups (step 905).

Figure 10:
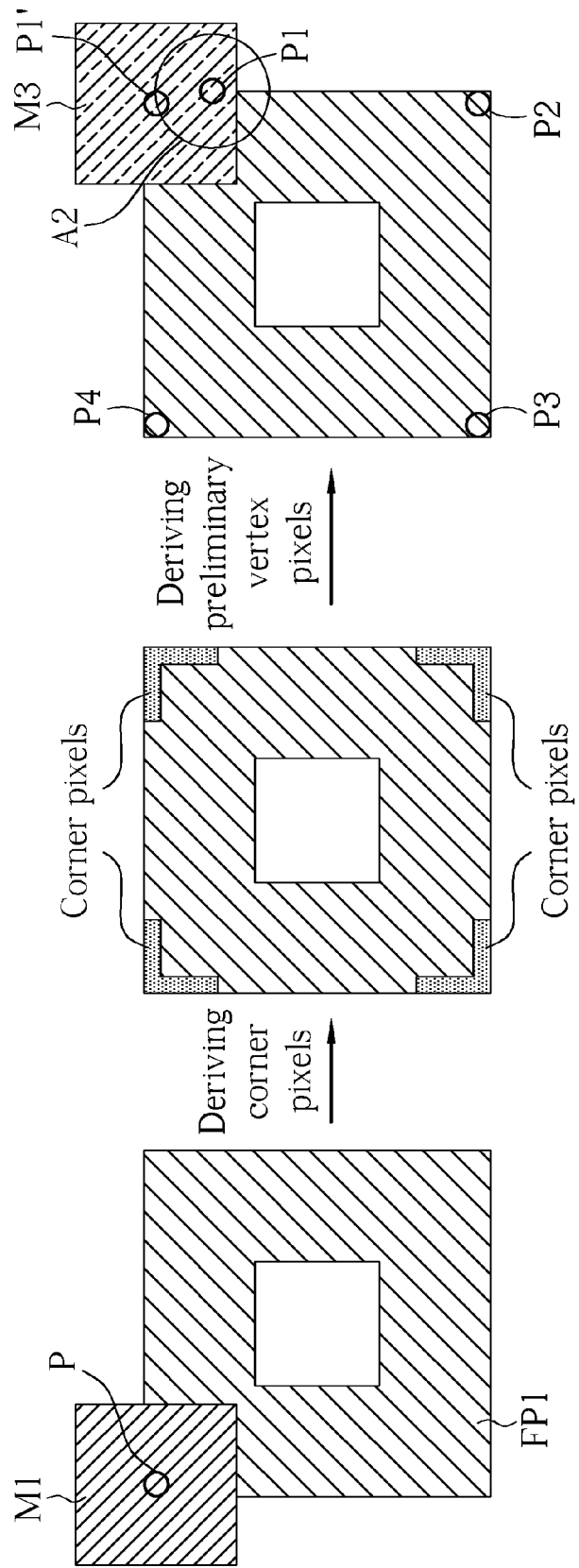
FIG. 10 is an exemplary operation diagram of a finder pattern positioning circuit according to an embodiment of the present invention.

For an example of this, please refer to FIG. 10, which is an exemplary operation diagram of the finder pattern positioning circuit 2113 according to an embodiment of the present invention. In FIG. 10, for a finder pattern group FP1, the corner capture unit 2113a of the finder pattern positioning circuit 2113 determines a plurality of edge pixels according to luminance values of a plurality of neighboring pixels near each pixel within the finder pattern group FP1, and determines whether each edge pixel is a corner pixel according to luminance values of a plurality of neighboring pixels within a first range around the edge pixel. When a ratio of low-luminance pixels to high-luminance pixels within the neighboring pixels is within a predetermined range, the corner capture unit 2113a categorizes the edge pixel as a corner pixel. Next, the corner capture unit 2113a applies a mask M1 for an edge pixel P to derive luminance values of neighboring pixels within a first predetermined range (i.e., the coverage of the mask M1) of the edge pixel P, and categorizes all the neighboring pixels within the first predetermined range as high-luminance pixels or low-luminance pixels according to a luminance threshold. If the edge pixel P is not located at a corner of the finder pattern FP1, the ratio of low-luminance pixels within the first predetermined range to high-luminance pixels within the first predetermined range is lower than a specific value since most pixels around the edge pixel P are low-luminance pixels; if the edge pixel P is located at a corner of the finder pattern FP1, the ratio of low-luminance pixels within the first predetermined range to high-luminance pixels within the first predetermined range is within a predetermined range. In this embodiment, if the ratio of low-luminance pixels within the first predetermined range to high-luminance pixels within the first predetermined range is indicated by R, wherein R=number of high-luminance pixels/number of low-luminance pixels, the corner capture unit 2113a will determine whether the edge pixel P is a corner pixel or not according to the following equation:

$$3.0 \geq R \geq 1.5 \tag{2}$$

When there is no distortion in the input image IMG_IN, the value of R is theoretically very close to 3; however, considering projection distortion, setting a value 1.5 as a lower limit of R should be proper to derive corner pixels of the finder pattern FP1 more correctly.

After the corner capture unit 2113a processes all pixels within the finder pattern FP1, the preliminary vertex capture unit 2113b derives a plurality of preliminary vertex pixels according to relative positions of all corner pixels of the finder pattern group FP1. For instance, the preliminary vertex capture unit 2113b will assign one of the corner pixels (whose coordinate is (X, Y)) as a first preliminary vertex pixel P1 (whose coordinate is (X1, Y1)=(X, Y)), and compares all the other corner pixels with the first preliminary vertex pixel. When a horizontal coordinate of a specific corner pixel (whose coordinate is (X', Y')) is larger than a horizontal coordinate of the first preliminary vertex pixel P1, i.e., X'>X1, the preliminary vertex capture unit 2113b assigns the specific corner pixel as the first preliminary vertex pixel P1 instead (i.e., (X1, Y1)=(X', Y')). After processing all the corner pixels, the preliminary vertex capture unit 2113b derives a location of the first preliminary vertex pixel P1 (i.e., the pixel on the farthest right side of the finder pattern FP1). Likewise, the preliminary vertex capture unit 2113*b* can derive a plurality of preliminary vertex pixels in the same way. However, in other embodiments, the preliminary vertex capture unit 2113*b* might only derive three preliminary vertex pixels. Under this circumstance, the preliminary vertex capture unit 2113*b* will deduce the fourth preliminary vertex pixel according to the three known preliminary vertex pixels. In addition, the preliminary vertex capture unit 2113*b* can modify criteria of deriving preliminary vertex pixels according to different design requirements.

After the preliminary vertex capture unit 2113*b* derives four preliminary vertex pixels P1, P2, P3 and P4, the vertex capture unit 2113*c* continues to apply a mask M3 for neighboring pixels with a second predetermined range A2 around each derived preliminary vertex pixel to derive a ratio of high-luminance pixels within a third predetermined range (i.e., the coverage of the mask M3) around the neighboring pixels to low-luminance pixels within the third predetermined range around the neighboring pixels. For example, a ratio of high-luminance pixels within the third predetermined range around a neighboring pixel P1' to low-luminance pixels within the third predetermined range around the neighboring pixel P1' is denoted by R', wherein the neighboring pixel P1' is close to the preliminary vertex pixel P1 and R'=number of high-luminance pixels/number of low-luminance pixels. When R' is a maximum value, it means that the neighboring pixel P1' has the most similar characteristic of a vertex among all neighboring pixels around the preliminary vertex pixel P1. The vertex capture unit 2113*c* thereby determines that the neighboring pixel P1' is a vertex pixel. Via the vertex capture unit 2113*c*, the finder pattern positioning circuit 2113 can further derive all vertex pixels of finder pattern FP1 with accuracy. Finally, the position information unit 2113*d* will determine location information of all finder patterns according to centers of all the finder pattern groups and all vertex pixels derived by the vertex capture unit 2113*c*, and output the position information to the tag searching element 2120.

Figure 11:
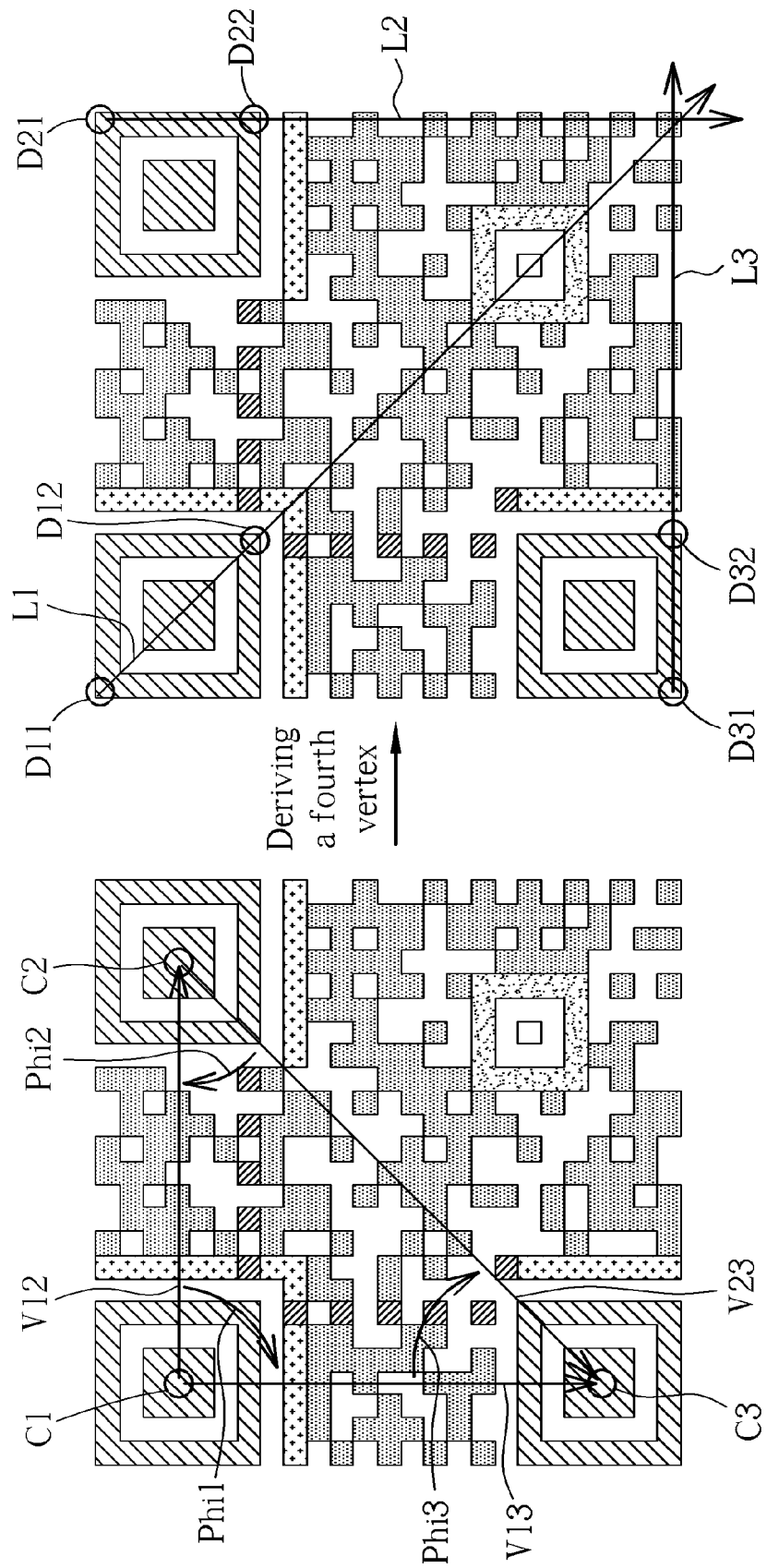
FIG. 11 is an operation diagram of deriving the position of the QR code by a tag searching element according to finder pattern position information.
Figure 12:
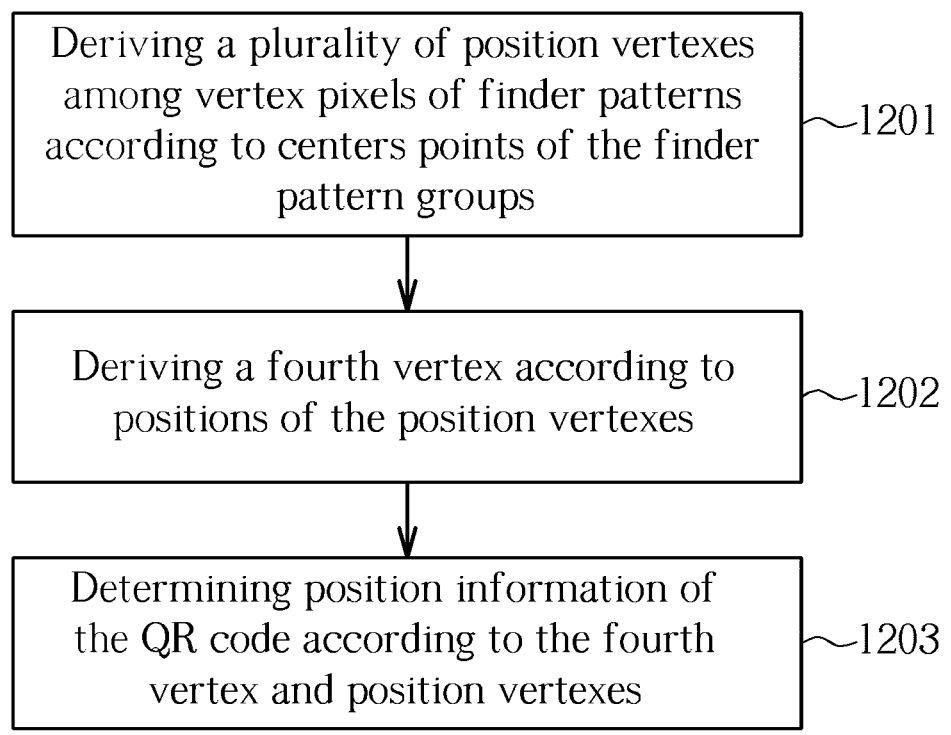
FIG. 12 is an exemplary operation diagram of a tag searching element according to one embodiment of the present invention.

The tag searching element 2120 is coupled to the group searching element 2110, and is for receiving finder pattern position information from the group searching element 2110 and deriving position information of the QR code according to the finder pattern position information. Please refer to FIG. 11 and FIG. 12, FIG. 11 is an operation diagram of deriving the position of the QR code by the tag searching element 2120 according to the finder pattern position information, and FIG. 12 is an exemplary operation diagram of the tag searching element 2120. First of all, the tag searching element 2120 will derive centers C1, C2 and C3 of the finder patterns, and determines three vectors V12, V13 and V23, which correspond to vectors from C1 to C2, from C1 to C3 and from C2 to C3, respectively, according to relative positions of centers C1, C2 and C3. An angle Phi1 formed by vectors V12, V13 is larger than angle Phi1 and angle Phi3, which are formed by vectors V12, V23 and V13, V23, respectively, therefore, the tag searching element 2120 can derive three set of position vertexes D11 and D12, D21 and D22, D31 and D32 according to centers C1, C2, C3 of the finder pattern groups (step 1201). Via those position vertexes, the tag searching element 2120 continues to derive three vectors L1, L2 and L3 corresponding to vectors pointing from D11 to D12, from D21 to D22 and from D31 to D32, respectively. From intersection points of the vectors L1, L2 and L3, the tag searching element 2120 can derive a fourth vertex of the QR code corresponding to the input image IMG_IN (step 1202). In this embodiment, the fourth vertex is generated from an average of the three intersection points of the vectors L1, L2 and L3. Finally, the tag searching element 2120 determines the position information of the QR code according to the fourth vertex, position vertex D11, D21 and D31 (i.e., four vertexes of the QR code) (step 1203). Please note that this embodiment is only an illustration of a characteristic of the present invention, it is not supposed to be a limitation to the present invention, for example, the vectors V12, V13 and V23 are not limited to be vectors from C1 to C2, from C1 to C3 and from C2 to C3, respectively, but can also be vectors from C2 to C1, from C3 to C1 and from C3 to C2, respectively. As long as apparatus and methods utilizing the position information of the finder patterns to derive position information of the QR code, they all comply with a spirit of the present invention.

To decrease an influence from the projection distortion, the ordinary QR code processing apparatus, after receiving an image with a QR code, performs a preprocessing procedure to convert a distorted QR code image into a standard and easy-to-handle QR code image via a matrix. An ordinary matrix conversion can be denoted as follows:

$$A' = H * A \quad (3)$$

or $$\begin{bmatrix} a' \\ b' \\ c' \end{bmatrix} = \begin{bmatrix} h11 & h12 & h13 \\ h21 & h22 & h23 \\ h31 & h32 & h33 \end{bmatrix} \cdot \begin{bmatrix} a \\ b \\ c \end{bmatrix} \quad (4)$$

With further conversion, it can be denoted as the following equation:

$$\begin{bmatrix} -x1 & -y1 & -1 & 0 & 0 & 0 & P1x1 & P1y1 \\ 0 & 0 & 0 & -x1 & -y1 & -1 & Q1x1 & Q1y1 \\ -x2 & -y2 & -1 & 0 & 0 & 0 & P2x2 & P3y2 \\ 0 & 0 & 0 & -x2 & -y2 & -1 & Q2x2 & Q2y2 \\ -x3 & -y3 & -1 & 0 & 0 & 0 & P3x3 & P3y3 \\ 0 & 0 & 0 & -x3 & -y3 & -1 & Q3x3 & Q3y3 \\ -x4 & -y4 & -1 & 0 & 0 & 0 & P4x4 & P4y4 \\ 0 & 0 & 0 & -x4 & -y4 & -1 & Q4x4 & Q4y4 \end{bmatrix} \cdot \begin{bmatrix} h11 \\ h12 \\ h13 \\ h21 \\ h22 \\ h23 \\ h31 \\ h32 \end{bmatrix} = \begin{bmatrix} P1 \\ Q1 \\ P2 \\ Q2 \\ P3 \\ Q3 \\ P4 \\ Q4 \end{bmatrix} \quad (5)$$

To solve for equation (5), four known sets in two coordinate systems must be required (i.e., four points in one coordinate system and four corresponding points in another coordinate system) to derive a solution of matrix H. In this embodiment, the QR code processing apparatus 2000 utilizes the four vertexes of the QR code for calculation.

Figure 13:
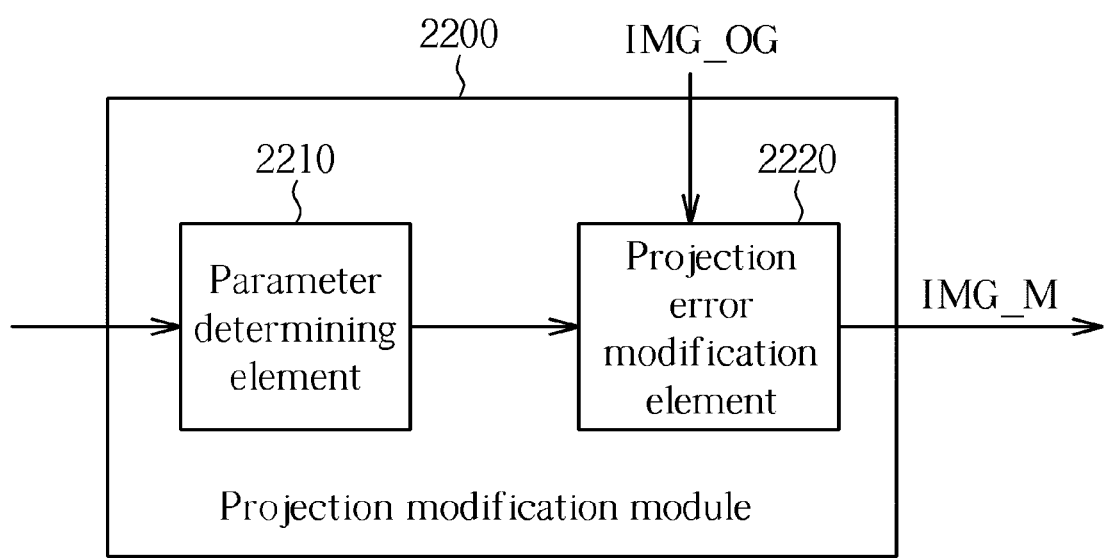
FIG. 13 is an exemplary block diagram of the projection modification module shown in FIG. 4.
Figure 14:
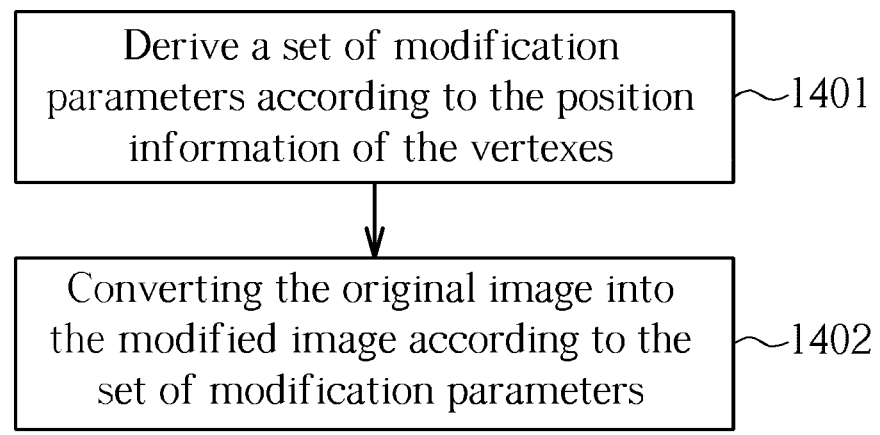
FIG. 14 is an exemplary operation flowchart of the projection modification module shown in FIG. 4.
Figure 15:
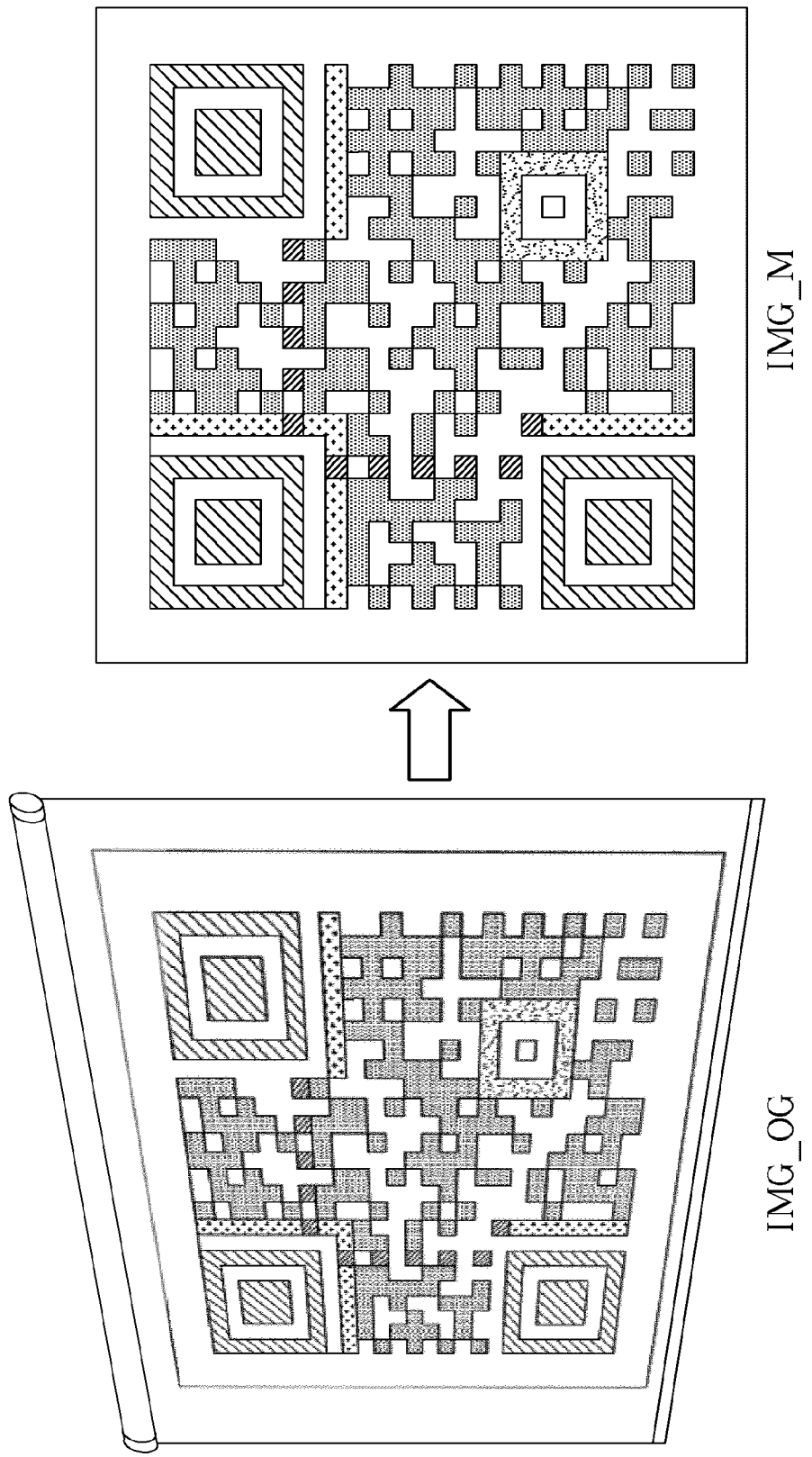
FIG. 15 is an exemplary diagram of a result of converting a QR code within an original image into a modified via a QR code processing apparatus according to one embodiment of the present invention.

Please refer to FIG. 13 and FIG. 14 in conjunction with FIG. 4. FIG. 13 is an exemplary block diagram of the projection modification module 2200 in FIG. 4, and FIG. 14 is an exemplary operation flowchart of the projection modification module 2200 in FIG. 4. The projection modification module 2200 includes a parameter determining element 2210 and a projection error modification element 2220. Since the tag searching element 2120 will derive the fourth vertex and those position vertexes of the QR code within the original image IMG_OG, the parameter determining element 2210 can thereby derive a set of modification parameters, i.e., the matrix H in equation (5), according to the position information of the vertexes (step 1401). The projection error modification element 2220 receives the original image IMG_OG and converts the original image IMG_OG into the modified image IMG_M according to the set of modification parameters (step 1402). The aforementioned matrix conversion should be obvious to those skilled in this field, so further description is omitted here for brevity. Please refer to FIG. 15, which is an exemplary diagram of a result of converting the QR code within the original image IMG_OG into the modified image IMG_M via the QR code processing apparatus 2000 according to one embodiment of the present invention. From FIG. 15, it should be obvious that the QR code processing apparatus 2000 is capable of deriving the QR code and modifying the projection distortion so as to provide a better QR code for following processing apparatus.

Figure 16:
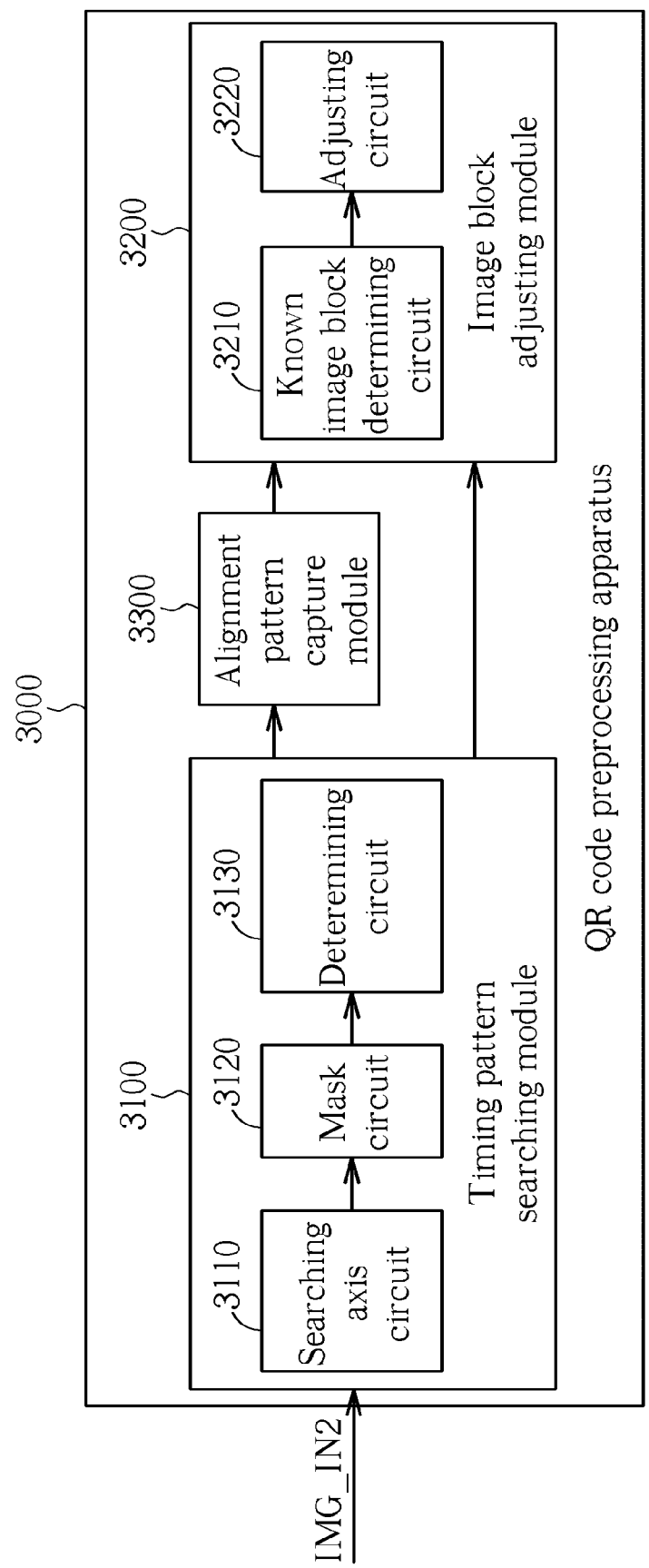
FIG. 16 is a system block diagram of a QR code preprocessing apparatus according to an embodiment of the present invention.
Figure 17:
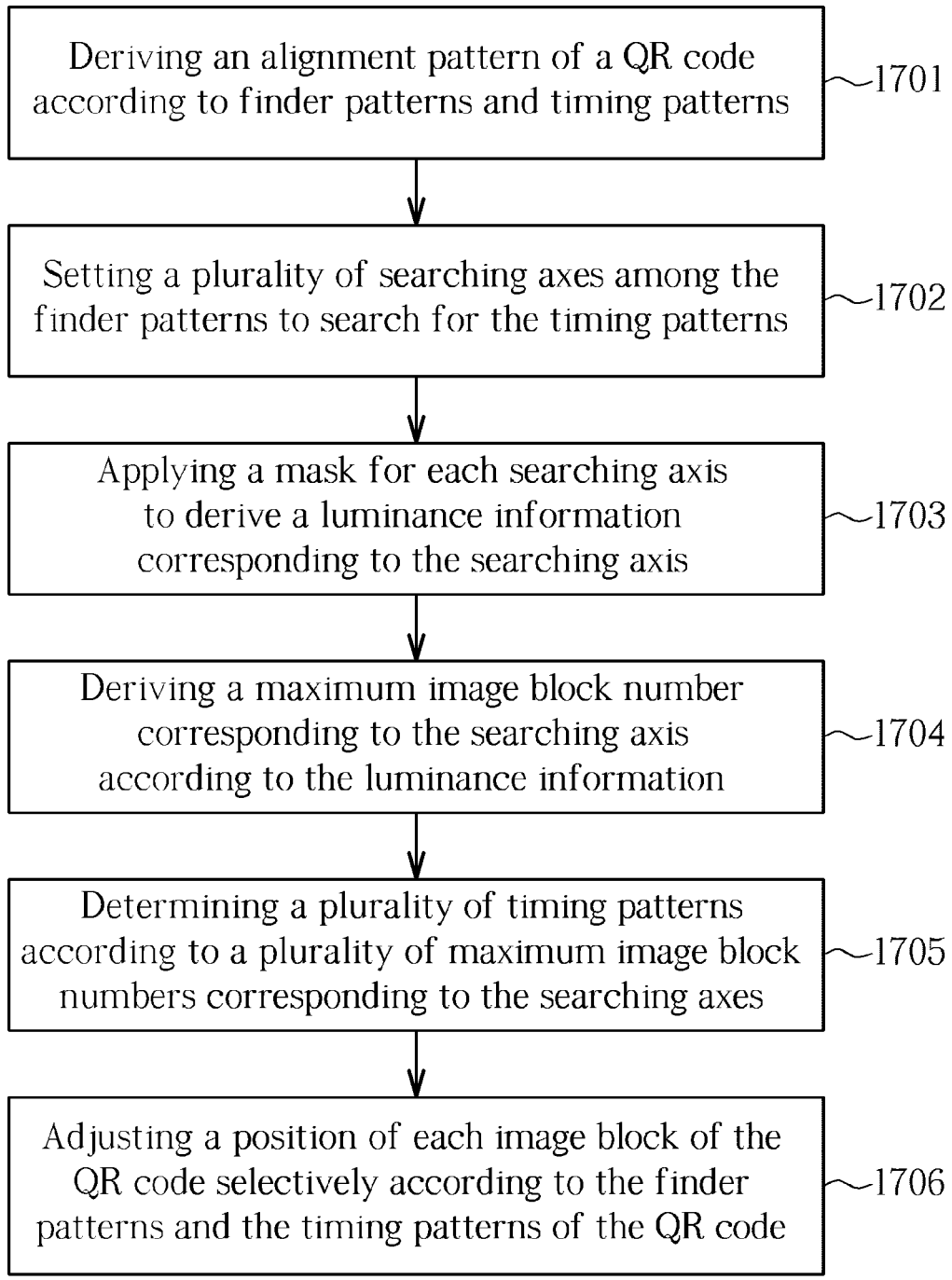
FIG. 17 is an exemplary operation flowchart of the QR code preprocessing apparatus shown in FIG. 16.

According to another embodiment of the present invention, a QR code preprocessing apparatus 3000 is disclosed to convert an input image IMG_IN2 into a QR code according to the input image IMG_IN2 and finder pattern position information of the QR code, wherein the QR code comprises a plurality of image blocks which are basic units for decoding the QR code, i.e., the smallest black/white grid within the QR code. Please refer to FIG. 16 and FIG. 17 simultaneously. FIG. 16 is a system block diagram of a QR code preprocessing apparatus 3000 according to an embodiment of the present invention, and FIG. 17 is an exemplary operation flowchart of the QR code preprocessing apparatus 3000 in FIG. 16. In FIG. 16, the QR code preprocessing apparatus 3000 has a timing pattern searching module 3100, an image block adjusting module 3200 and an align pattern capture module 3300, wherein the timing pattern searching module has a searching axis circuit 3110, a mask circuit 3120, and a determining circuit 3130, and the image block adjusting module 3200 has a known image block determining circuit 3210 and an adjusting circuit 3220. First of all, the alignment pattern capture module 3300 derives an alignment pattern of the QR code according to the finder patterns and the timing patterns (step 1701). Please note that, in this embodiment, the alignment pattern capture module 3300 is adopted to facilitate a calibration and adjustment of the QR code within the input image IMG_IN2; however, in a practical implementation, the input image IMG_IN2 can be processed directly without the alignment pattern capture module 3300. This kind of variation in design also falls within the scope of the present invention. Please refer to FIG. 1 again. It should be obvious that the timing patterns are distributed among the finder patterns of the QR code, therefore, the searching axis circuit 3110 will set a plurality of searching axes among those finder patterns to search for the timing patterns (step 1702), and the mask circuit 3120 will apply a mask for each searching axis to derive a luminance information corresponding to the searching axis (step 1703) and derive a maximum image block number corresponding to the searching axis according to the luminance information (step 1704). The determining circuit 3130 thereby determines a plurality of timing patterns according to a plurality of maximum image block numbers corresponding to the searching axes (step 1705). Finally, the image block adjusting module 3200 will selectively adjust a position of each image block of the QR code according to the finder patterns and the timing patterns of the QR code (step 1706).

Figure 18:
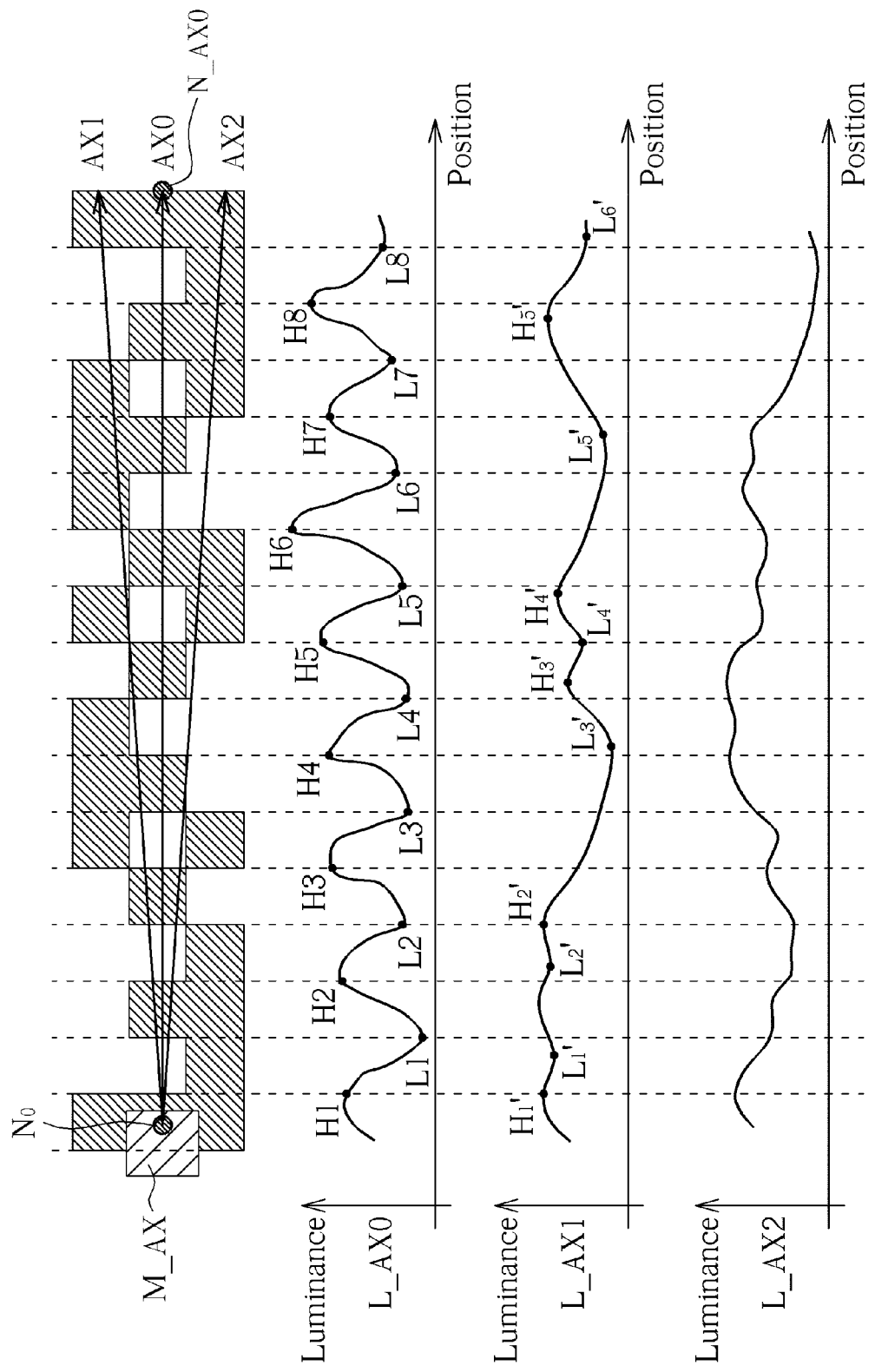
FIG. 18 is an operation diagram of determining a plurality of timing patterns by the timing pattern searching module shown in FIG. 16.

Please refer to FIG. 18 for a detailed illustration of an operation of the timing pattern searching module 3100. FIG. 18 is an operation diagram of determining a plurality of timing patterns by the timing pattern searching module 3100 in FIG. 16. Due to factors such as projection distortion of the QR code or insufficient image resolution, starting points and ending points of the timing patterns of the QR code may not be determined accurately, therefore, the searching axis circuit 3110 will substantially derive a position of searching axis according to the positions of the finder patterns. For simplifying the description hereof, in this embodiment, the searching axis circuit 3110 sets three searching axes AX0, AX1 and AX2 with the same starting point N0, however, this is for illustration purposes only and is not supposed to be a limitation of the present invention. In other words, the searching axis circuit 3110 can also set more than three searching axes, and the starting points or the ending points are not necessarily required to be the same. Next, the mask circuit 3120 applies a mask M_AX to collect luminance information L_AX0, L_AX1 and L_AX2 corresponding to searching axes AX0, AX1 and AX2, respectively. When applying the mask M_AX for the searching axis AX0, the mask circuit 3120 locates the mask M_AX at the starting point of the searching axis AX0 N0, and starts to collect luminance values of all pixels within the coverage of the mask M_AX and documents a sum of the luminance values. Next, the mask circuit 3120 moves a distance of a pixel from the starting point N0 toward an ending point N_AX0 of the searching axis AX0 along the searching axis AX0, then collects luminance values of all pixels within the coverage of the mask M_AX and documents a sum of the luminance values. The aforementioned steps are repeated until the mask circuit 3120 finishes applying the mask M_AX along the searching axis AX0 and collecting all luminance values thereof. In this way, the mask circuit 3120 can derive a set of luminance information L_AX0 corresponding to the searching axis AX0. Likewise, as shown in FIG. 18, the mask circuit 3120 can apply the aforementioned steps to derive sets of luminance information L_AX1, L_AX2 corresponding to the searching axes AX1, AX2, respectively. Among three sets of luminance information L_AX0, L_AX1 and L_AX2, the mask circuit 3120 will determine relative peaks and relative valleys of the luminance information according to a specific distance. For example, on the curve of the luminance information L_AX0, no point is higher than a point H1 within the specific distance from the point H1, and the mask circuit 3120 therefore determines that the point H1 is a relative peak. As a result, the mask circuit 3120 determines relative peaks H1~H8 and relative valleys L1~L8 of the luminance information L_AX0. Since the timing pattern has a figure pattern of alternately interleaving black and white grids, the mask circuit 3120 will further detect positions of the relative peaks and the relative valleys to derive a maximum image block number according to the derived information of the relative peaks and the relative valleys. For example, the luminance information L_AX0 in FIG. 18 has the relative peaks H1~H8 and the relative valleys L1~L8, and an arrangement thereof: H1, L1, H2, L2 . . . H8, L8. A relative valley follows immediately next to a relative peak, therefore, the mask circuit 3120 will determine that the luminance information L_AX0 has a maximum image block number N_AX0=8. The luminance information L_AX1 has the relative peaks H1'~H5' and the relative valleys L1'~L5'. When determining a maximum image block number, the mask circuit 3120 detects a sequence: H1', L1', H2', L3', H3', L4', H4', L5', H5', L6', wherein the relative valley L2' is omitted due to no nearby relative peaks on both sides. The mask circuit 3102 thereby determines that the maximum image block number N_AX1, which corresponds to the luminance information L_AX1, is equal to 5. Likewise, the mask circuit 3120 determines that the luminance information L_AX2 has a maximum image block number N_AX2 and N_AX2<8. The determining circuit 3130 thereby refers to a maximum value among the maximum image block numbers N_AX0, N_AX1 and N_AX2 and determines a searching axis, which corresponds to the maximum value (i.e., the maximum image block number N_AX0, which corresponds to the searching axis AX0), as the location of the timing pattern. In this way, the timing pattern searching module 3100 can derive locations of both timing patterns of the QR code within the input image IMG_IN2.

Since the present invention adopts relative luminance to discern timing patterns, even when the input image IMG_IN2 is influenced by shadow such that both sides of one timing pattern have a huge luminance difference, the timing pattern searching module 3100 can still derive information of the timing pattern correctly without the shadow influence.

Figure 19:
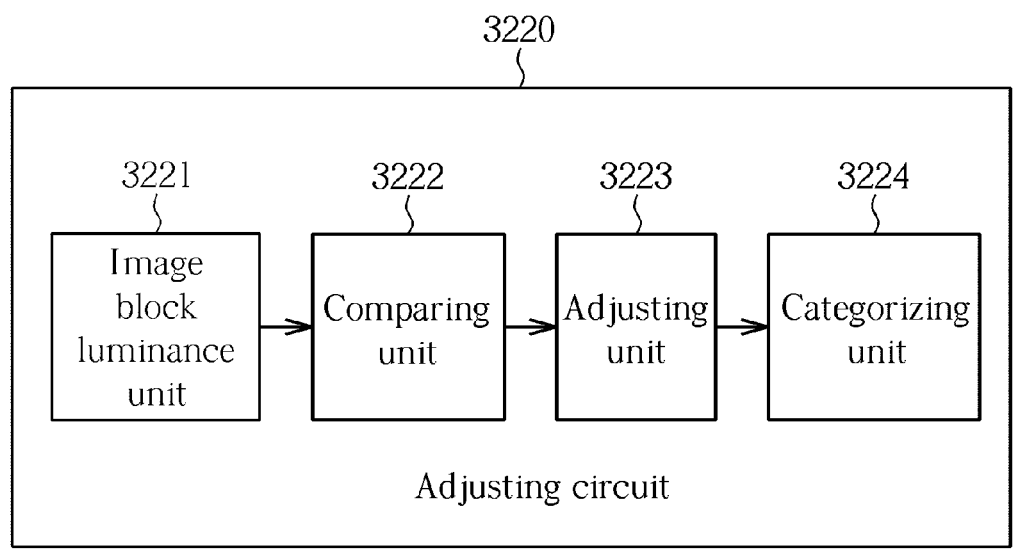
FIG. 19 is a system block diagram of the adjusting circuit shown in FIG. 16.
Figure 20:
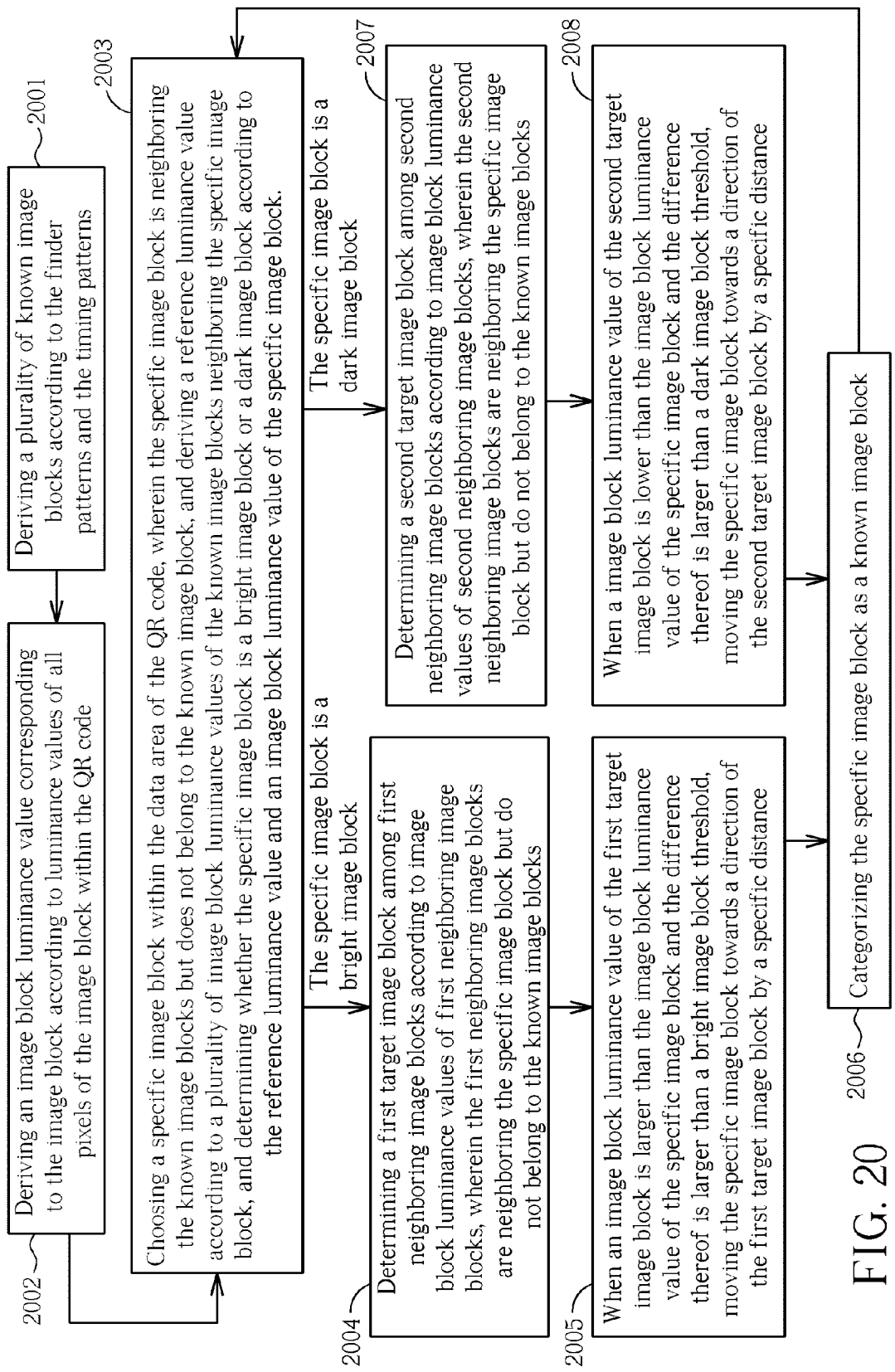
FIG. 20 is an exemplary operation flowchart of the image block adjusting module shown in FIG. 16.

Please refer to FIG. 19 and FIG. 20 simultaneously. FIG. 19 is a system block diagram of the adjusting circuit 3220 in FIG. 16, and FIG. 20 is an exemplary operation flowchart of the image block adjusting module 3200 in FIG. 16. In FIG. 19, the adjusting circuit 3220 includes an image block luminance unit 3221, a comparing unit 3222, an adjusting unit 3223 and a categorizing unit 3224. Firstly, the known image block determining circuit 3210 derives a plurality of known image blocks according to the finder patterns and the timing patterns (step 2001): for example, the finder patterns and the timing patterns derived previously have very specific formats of figure patterns, e.g., the finder pattern must have a dark image block surrounded by a dark square frame formed by dark image blocks, and the timing patter must have alternately interleaving bright/dark image blocks wherein each bright/dark image block is a standard basic unit. Therefore, it is easy to identify a proper position and an accurate size of each image block within the finder patterns and the timing patterns. The information of the finder patterns and the timing patterns can be further utilized for each image block distributed within the data area.

For each image block within the QR code, the image block luminance unit 3221 derives an image block luminance value corresponding to the image block according to luminance values of all pixels of the image block within the QR code (step 2002). The comparison unit 3222 chooses a specific image block within the data area of the QR code, wherein the specific image block is neighboring the known image blocks but does not belong to the known image block. The comparison unit 3222 derives a reference luminance value according to a plurality of image block luminance values of the known image blocks neighboring the specific image block, and determines whether the specific image block is a bright image block or a dark image block according to the reference luminance value and an image block luminance value of the specific image block (step 2003). For example, since the timing pattern derived by the timing pattern searching module 3100 is a specific format of the QR code it must be a straight line composed of alternately interleaving bright/dark image blocks. When processing the specific image block, the comparing unit 3222 can choose an average of luminance values of two adjacent image blocks, which are among a timing pattern neighboring the specific block and one of those two adjacent image block is a bright image block while the other is a dark image block, as the reference luminance value. When the image block luminance value of the specific image block is larger than the reference luminance value, the comparing unit 3222 can determine that the specific image block is a bright image block; otherwise, when the image block luminance value of the specific image block is lower than the reference luminance value, the comparing unit 3222 can determine that the specific image block is a dark image block.

When the specific image block is determined to be a bright image block by the comparing unit 3222, the adjusting unit 3223 determines a first target image block among first neighboring image blocks according to image block luminance values of first neighboring image blocks, wherein the first neighboring image blocks are neighboring the specific image block but do not belong to the known image blocks (step 2004). When an image block luminance value of the first target image block is larger than the image block luminance value of the specific image block and the difference thereof is larger than a bright image block threshold TH_1, the adjusting unit 3223 moves the specific image block towards a direction of the first target image block by a specific distance (step 2005). When the specific image block is a dark image block, the adjusting unit 3223 determines a second target image block among second neighboring image blocks according to image block luminance values of second neighboring image blocks, wherein the second neighboring image blocks are neighboring the specific image block but do not belong to the known image blocks (step 2007). When an image block luminance value of the second target image block is lower than the image block luminance value of the specific image block and the difference thereof is larger than a dark image block threshold TH_2, the adjusting unit 3223 moves the specific image block towards a direction of the second target image block by a specific distance (step 2008). Finally, the categorizing unit 3224 categorizes the specific image block processed by the adjusting unit 3223 as a known image block (step 2006).

Figure 21:
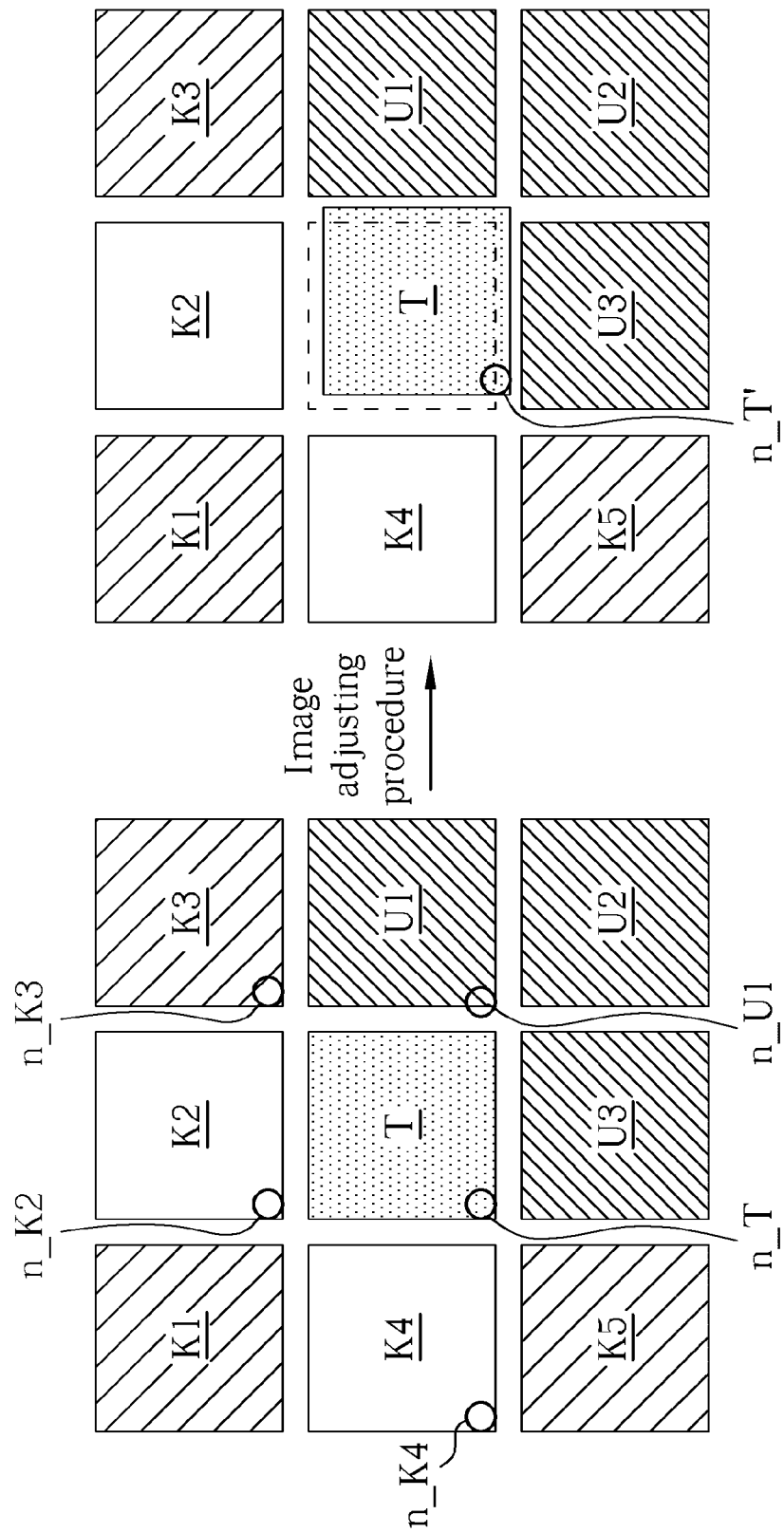
FIG. 21 is an operation diagram of an image block adjusting module according to one embodiment of the present invention.

Please refer to FIG. 21 for a further illustration of an operation of the image block adjusting module 3200. FIG. 21 is an operation diagram of the image block adjusting module 3200 according to an embodiment of the present invention. In this embodiment, the image blocks K1~K5 are part of the timing patterns, in other words, image blocks K1~K5 are known image blocks (i.e., the image blocks which have been processed), wherein the image block K1, K3 and K5 are dark image blocks, image block K2 and K4 are bright image blocks, image blocks T, U1~U3 are image blocks to be processed and image block T is the specific image block currently processed by the image block adjusting module 3200. In FIG. 21, the known image blocks K2, K4 have reference points n_K2 (whose coordinate is (X_K2, Y_K2)) and n_K4 (whose coordinate is (X_K4, Y_K4)), respectively. The image adjusting module 3200 thereby refers to the reference points n_K2, n_K4 to assign the specific image block T a reference point n_T such that the reference point n_T is assigned a coordinate (X_K2, Y_K4). In other words, the image adjusting module 3200 assigns the X coordinate of the known image block K4, which is located upper to the specific image block T, to the X coordinate of the reference point n_T of the specific image block T, and assigns the Y coordinate of the known image block K2, which is located on the left side of the specific image block T, to the Y coordinate of the reference point n_T of the specific image block T. Likewise, for the image block U1, the image block adjusting module 3200 assigns the X coordinate of the known image block K3, which is located upper to the image block U1, to the X coordinate of a reference point n_U1 of the image block U1, and assigns the Y coordinate of the specific image block T, which is located on the left side of the image block U1, to the Y coordinate of a reference point n_U1 of the image block U1. In this way, the image block adjusting module 3200 can derive coordinates of all reference points of all image blocks within the QR code.

Firstly, the comparing unit 3222 will derive a reference luminance value Lref according to luminance values of known image blocks neighboring the specific image block T and determine whether the specific image block T is a dark image block or a bright image block. In this embodiment, the reference luminance value Lref can be derived from luminance values of the known image blocks K2~K5 as follows:

$$Lref = ((L\_K4 + L\_K5)/2 + (L\_K2 + L\_K3)/2)/2 \quad (6)$$

From equation (6), the comparing unit 3222 will calculate an average of the luminance values of the bright image K4 and the neighboring dark image block K5, i.e., (L_K4+L_K5)/2, and calculate an average of the luminance values of the bright image K2 and the neighboring dark image block K3, i.e., (L_K2+L_K3)/2, and finally calculate an average of the aforementioned two average values to derive the reference luminance value Lref. Therefore, the reference luminance value Lref can be regarded as an average luminance value of image blocks around the specific image block T. In other words, an image block with a luminance value more than the reference luminance value Lref can be regarded as a bright image block, and an image block with a luminance value less than the reference luminance value Lref can be regarded as a dark image block. Via the steps described above, the image block adjusting module 3200 can dynamically process different specific image blocks with different reference luminance values. In this way, the influence of shadow upon a determination of a bright/dark image block can be greatly eliminated.

When the specific image block T is determined as a bright image block by the comparing unit 3222, the adjusting unit 3223 checks if there is also a bright image block among image blocks U1, U2 and U3, which are unknown image blocks neighboring the specific image block T. If only image blocks U1, U2 are bright image blocks and a luminance value L_U2 of the image block U2 is higher than a luminance value L_U1 of the image block U1, the adjusting unit 3223 determines that the image block U2 is a first target image block. When the luminance value L_U2 of the image block U2 is higher than a luminance value L_T of the specific image block T and the difference thereof (L_U2-L_T) is larger than the bright image block threshold TH1, the adjusting unit 3223 will move the specific image block T towards a direction of the image block U2 (i.e. the first target image block) by a specific distance. In this embodiment, the specific distance is one pixel (please note that this is for illustrative purposes only and is not supposed to be a limitation of the present invention), therefore the adjusting unit 3223 will adjust the specific image block T with a modified reference point n_T', whose coordinate is (X_K2+1, Y_K4-1), as shown in FIG. 21. If there is no bright image block among image blocks U1, U2 and U3, and the luminance value of the first target image block is less than the luminance value of the specific image block or the difference thereof is less than the bright image block threshold TH_1, the adjusting unit 3223 will not adjust for the specific image block T and the reference point of the specific image block T will remain at the original n_T.

Likewise, when the specific image block is determined as a dark image block by the comparing unit 3222, a processing procedure performed by the image block adjusting module 3200 for the specific image block T is substantially the same as the processing procedure when the specific image block is determined as a bright image block by the comparing unit 3222. Further description is omitted here for brevity. In addition, the aforementioned steps of utilizing information (e.g., position and luminance value) of known image blocks to further derive information of unknown image blocks and to make adjustments are substantially the same, and descriptions are therefore omitted for brevity. In this embodiment, the known image blocks are derived from the initial finder patterns and the timing patterns; however, this is not supposed to be a limitation of the present invention. In other embodiments, for those image blocks within the finder patterns and the timing patterns, as long as there is information of at least one known image block around them, adjustments can also be made for the finder patterns and the timing patterns. This kind of variation in design also falls within the scope of the present invention.

Via the aforementioned steps, the image block adjusting module 3200 will process all image blocks of the QR code within the input image IMG_IN2 selectively. In this way, the QR code can be decoded and processed more easily.

Please note that the two aforementioned QR code processing methods and apparatus not only can be utilized independently, but can also be combined for application. For example, the modified image IMG_M outputted by the QR code processing apparatus 2000 in FIG. 4 can also be an input for the preprocessing apparatus 3000 in FIG. 16.

To summarize, the present invention provides a QR code processing method capable of capturing a QR code within an input image and deriving related information to modify potential errors such as projection distortion and uneven luminance. In addition the present invention can further adjust the QR code such that the QR code can be decoded and processed more easily by following processing apparatus.

Those skilled in the art will readily observe that numerous modifications and alterations of the device and method may be made while retaining the teachings of the invention.

What is claimed is:

1. A processing method of quick response code (QR code), for converting an input image into a QR code according to the input image and finder pattern position information of the QR code, the QR code comprising a plurality of image blocks, the processing method comprising:
a timing pattern searching procedure, comprising:
setting a plurality of searching axes among a plurality of finder patterns of the QR code;
for each searching axis:
applying a mask to derive a luminance information of the searching axis; and
deriving a maximum image block number corresponding to the searching axis according to the luminance information; and
determining a plurality of timing patterns according to a plurality of maximum image block numbers respectively corresponding to the searching axes;
an image block adjusting procedure, for selectively adjusting a position of each image block of the QR code according to the finder patterns and the timing patterns of the QR code, comprising:
deriving a plurality of known image blocks according to the finder patterns and the timing patterns;
an adjusting procedure, comprising:
for each image block within the QR code:
deriving an image block luminance value corresponding to the image block according to luminance values of all pixels of the image block within the QR code;
choosing a specific image block within a data area of the QR code, wherein the specific image block is neighboring the known image blocks but does not belong to the known image blocks;
deriving a reference luminance value according to a plurality of image block luminance values of the known image blocks neighboring the specific image block, and determining whether the specific image block is a bright image block or a dark image block according to the reference luminance value and an image block luminance value of the specific image block;
when the specific image block is a bright image block:

determining a first target image block among first neighboring image blocks according to image block luminance values of first neighboring image blocks, wherein the first neighboring image blocks are neighboring the specific image block but do not belong to the known image blocks; and when an image block luminance value of the first target image block is larger than the image block luminance value of the specific image block and a difference thereof is larger than a bright image block threshold, moving the specific image block toward the first target image block by a specific distance;

when the specific image block is a dark image block:
determining a second target image block among second neighboring image blocks according to image block luminance values of second neighboring image blocks, wherein the second neighboring image blocks are neighboring the specific image block but do not belong to the known image blocks; and when an image block luminance value of the second target image block is lower than the image block luminance value of the specific image block and a difference thereof is larger than a dark image block threshold, moving the specific image block toward the second target image block by a specific distance; and categorizing the specific image block as a known image block; and repeating the adjusting procedure until each image block within the data area of the QR code is categorized as the known image block; and deriving an alignment pattern of the QR code according to the finder patterns and the timing patterns.

2. A processing apparatus of quick response code (QR code), for converting an input image into a QR code according to the input image and finder pattern position information of the QR code, the QR code comprising a plurality of image blocks, the processing apparatus comprising:

a timing pattern searching module, comprising:
   a searching axis circuit, for setting a plurality of searching axes among a plurality of finder patterns of the QR code;
   a mask circuit, coupled to the searching axis circuit, where for each searching axis, the mask circuit applies a mask to derive a luminance information of the searching axis and derives a maximum image block number corresponding to the searching axis according to the luminance information, and
   a determining circuit, for determining a plurality of timing patterns according to a plurality of maximum image block numbers respectively corresponding to the searching axes;

an image block adjusting module, coupled to the timing pattern searching module, for selectively adjusting a position of each image block of the QR code according to the finder patterns and the timing patterns of the QR code, comprising:
   a known image block determining circuit, for deriving a plurality of known image blocks according to the finder patterns and the timing patterns; and an adjusting circuit, coupled to the known image block determining circuit, comprising:
      an image block luminance unit, wherein for each image block within the QR code, the image block luminance unit derives an image block luminance value corresponding to the image block according to luminance values of all pixels of the image block within the QR code;
      a comparison unit, coupled to the image block luminance unit, for choosing a specific image block within a data area of the QR code, wherein the specific image block is neighboring the known image blocks but does not belong to the known image blocks; deriving a reference luminance value according to a plurality of image block luminance values of the known image blocks neighboring the specific image block; and determining whether the specific image block is a bright image block or a dark image block according to the reference luminance value and an image block luminance value of the specific image block;
      an adjusting unit, coupled to the comparison circuit, wherein:
         when the specific image block is a bright image block, the adjusting unit determines a first target image block among first neighboring image blocks according to image block luminance values of first neighboring image blocks, where the first neighboring image blocks are neighboring the specific image block but do not belong to the known image blocks; and when an image block luminance value of the first target image block is larger than the image block luminance value of the specific image block and a difference thereof is larger than a bright image block threshold, the adjusting unit moves the specific image block toward the first target image block by a specific distance; and
         when the specific image block is a dark image block, the adjusting unit determines a second target image block among second neighboring image blocks according to image block luminance values of second neighboring image blocks, where the second neighboring image blocks are neighboring the specific image block but do not belong to the known image blocks; and when an image block luminance value of the second target image block is lower than the image block luminance value of the specific image block and a difference thereof is larger than a dark image block threshold, the adjusting unit moves the specific image block toward the second target image block by a specific distance; and
      a categorizing unit, coupled to the adjusting unit, for categorizing the specific image block as a known image block; and an alignment pattern capture module, coupled to the timing pattern searching module and the image block adjustment module, for deriving an alignment pattern of the QR code according to the finder patterns and the timing patterns.

* * * * *